(12) United States Patent
Watanabe et al.

(10) Patent No.: US 6,976,103 B1
(45) Date of Patent: Dec. 13, 2005

(54) DATA MIGRATION METHOD USING STORAGE AREA NETWORK

(75) Inventors: Naoki Watanabe, Tokyo (JP); Yoshifumi Takamoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 380 days.

(21) Appl. No.: 09/644,064

(22) Filed: Aug. 23, 2000

(30) Foreign Application Priority Data

Mar. 3, 2000 (JP) .............................. 2000-063289

(51) Int. Cl.⁷ .......................................... G06F 15/16
(52) U.S. Cl. ...................... 710/74; 709/203; 709/213; 709/223
(58) Field of Search .......................... 711/115, 149, 5, 711/100; 710/65, 21, 4, 74; 709/321, 4, 213, 709/203, 223

(56) References Cited

U.S. PATENT DOCUMENTS

| | | | |
|---|---|---|---|
| 5,544,347 A * | 8/1996 | Yanai et al. ................. | 711/162 |
| 5,680,640 A * | 10/1997 | Ofek et al. .................... | 710/19 |
| 5,896,548 A * | 4/1999 | Ofek ............................ | 710/20 |
| 5,898,828 A * | 4/1999 | Pignolet et al. ................ | 714/6 |
| 5,901,327 A * | 5/1999 | Ofek ............................. | 710/5 |
| 6,044,444 A * | 3/2000 | Ofek ........................... | 711/162 |
| 6,052,797 A * | 4/2000 | Ofek et al. .................... | 714/6 |
| 6,108,748 A * | 8/2000 | Ofek et al. ................. | 711/112 |
| 6,145,066 A * | 11/2000 | Atkin .......................... | 711/165 |
| 6,240,486 B1 * | 5/2001 | Ofek et al. ................. | 711/112 |
| 6,338,110 B1 * | 1/2002 | van Cruyningen .......... | 710/317 |
| 6,553,408 B1 * | 4/2003 | Merrell et al. .............. | 709/213 |
| 6,654,830 B1 * | 11/2003 | Taylor et al. ................. | 710/74 |

* cited by examiner

*Primary Examiner*—Kim Huynh
*Assistant Examiner*—Angel L. Casiano
(74) *Attorney, Agent, or Firm*—Mattingly, Stanger, Malur & Brundidge, P. C.

(57) ABSTRACT

A new disk system is connected to a switch that has been already connected to a host and old disk system. At that time, the new disk system is assigned in advance a port ID of the same value as the port ID that has been assigned to the F_Port of the switch, so that the new disk system will not be recognized from host 101. The new disk system read the configuration information of the old disk system. Then, in the switch, physical port ID 602 of old disk system 103 and physical port ID 602 of new disk system 104 are exchanged. The new disk system constructs volumes corresponding to the logical volume numbers and sizes of those volumes in the old disk system, and stores data of the old disk system in the corresponding volumes.

24 Claims, 22 Drawing Sheets

Fig 6
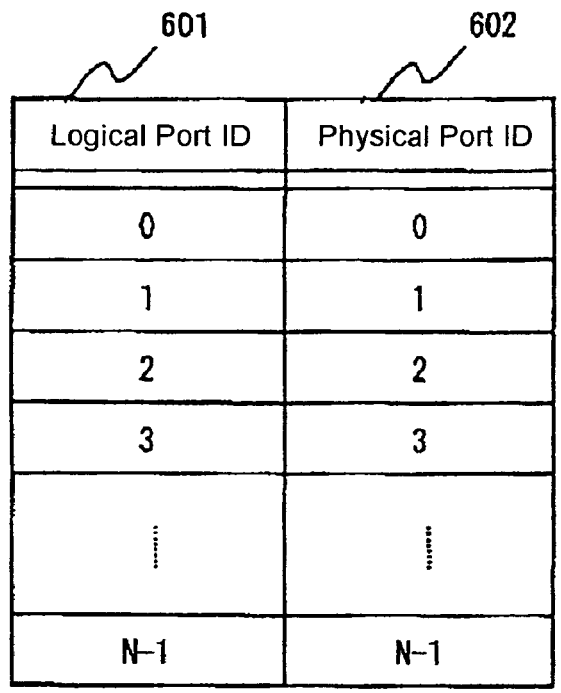
(A) Before Port Switching
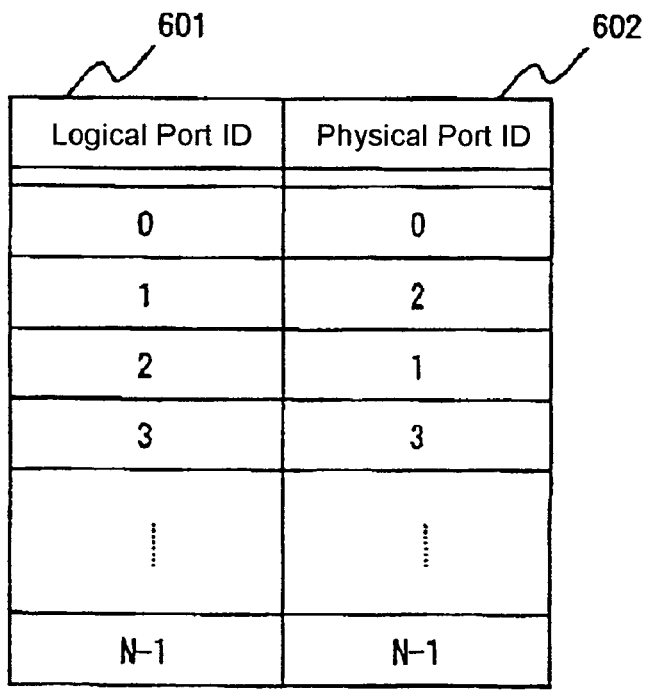
(B) After Port Switching

Fig 8

| VOLUME NUMBER ~801 | SLOT NUMBER ~802 | STATUS ~803 |
|---|---|---|
| 1 | 10 | MIGRATING |
| 1 | 25 | DONE |
| 1 | 26 | DONE |
| 2 | 15 | DONE |
| 2 | 16 | DONE |
| ⋮ | ⋮ | ⋮ |

Fig 14

| Logical Port ID | Physical Port ID | Status |
|---|---|---|
| 0 | 0 | Normal |
| 1 | 2 | Migrating |
| 2 | 1 | Normal |
| 3 | 3 | Normal |
| ⋮ | ⋮ | ⋮ |
| N-1 | N-1 | Normal |

DATA MIGRATION METHOD USING STORAGE AREA NETWORK

BACKGROUND OF THE INVENTION

1. Field of the Invention

The present invention relates to a method of additionally attaching a new disk system (migration destination disk system) to a storage area network (hereafter referred to as SAN) and migrating data from an old disk system (migration source disk system), which is already connected to the SAN, to that new disk system and a device thereof.

2. Description of Related Art

Conventional computer systems are configured with a plurality of servers connected by a network such as a LAN and disk units are directly connected to each computer. The data inside each disk unit was managed by the directly connected server. In other words, data was managed in a distributed condition.

However, the SAN which adopts a configuration in which a plurality of servers, a plurality of disk units, backup units, etc. are connected by a switch or hub has recently become a hot topic. Fiber channels are used to physically connect these units to a switch or hub. The advantages of configuring a system using a SAN are superior scalability and the realization of reduced management cost since unified management can be performed by integrating data distributed over a plurality of disk units. Consequently, a SAN is well suited to a large-scale system. Because many resources are interconnected with a SAN, the management of these resources is an important topic. The management of a logical volume (such as backup), as the management of a disk unit, is one example of that. At present, these management methods are being studied by the SNIA (Storage Networking Industry Association) and NSIC (National Storage Industry Consortium).

On the other hand, U.S. Pat. No. 5,680,640 discloses a system and method of migrating data from a first data storage system to a second data storage system. A summary of that is as follows. A first data storage system already connected to a host, network or other data processing system is detached from the aforementioned host and connected to a second data storage system. The aforementioned second data storage system is connected to the aforementioned host or aforementioned data processing system. The aforementioned second data storage system contains a data map or data table that indicates which data element is stored in the aforementioned second storage system and which data in the aforementioned first data storage system has been copied to the aforementioned second storage system. When the aforementioned host, aforementioned network or aforementioned data processing system issues a request for data to the aforementioned second storage system, the aforementioned second data storage system judges whether that data has been stored in the aforementioned second data storage system or in the aforementioned first storage system. If the data has been stored in the aforementioned second data storage system, that data can be used by the host, etc. If the data is not stored in the aforementioned second data storage system, the aforementioned second data storage system issues a request to the aforementioned first data storage system, and that data can be used by the aforementioned host, etc. Then, the aforementioned second data storage system writes that data to its own system and updates the aforementioned data map or aforementioned data table. When the aforementioned second data storage system is not busy, it scans the aforementioned data map or aforementioned data table, determines which data of the aforementioned first data storage system has not yet been copied into its own system, and executes the copying of that data and updating of the aforementioned data map or aforementioned data table.

According to the data migration system and method disclosed in U.S. Pat. No. 5,680,640, independent from the aforementioned host, it is possible to execute data migration from the aforementioned first data storage system to the aforementioned second data storage system.

However, in the aforementioned data migration system and method, when the aforementioned second data storage system is utilized, the procedure of detaching the aforementioned first data storage system from the aforementioned host, connecting it to the aforementioned second data storage system, and connecting the aforementioned second data storage system to the aforementioned host is necessary. Consequently, at least during the interval beginning when the aforementioned first data storage system is detached from the aforementioned host until the aforementioned second data storage system is connected to the aforementioned host and the aforementioned first storage system, the aforementioned host cannot issue I/O (Input/Output) requests. In addition, during that interval it is necessary to temporarily suspend applications or other programs on the aforementioned host that use the aforementioned first data storage system. To further suppress costs associated with data migration, it is necessary to further reduce the time when I/O requests cannot be issued and the time when applications are suspended.

In addition, in the aforementioned data migration system and method, to connect the aforementioned first data storage system to the aforementioned second data storage system, a channel must be newly provided to each data storage system.

Further, in U.S. Pat. No. 5,680,640, a data migration system and method in a SAN environment are not disclosed.

SUMMARY OF THE INVENTION

The object of the present invention is to provide data migration systems and methods that are well suited to a SAN environment.

An overview of the typical data migration of the present invention is as follows. A host computer and first disk unit are each connected by means of a communication channel to a switch port, and it is assumed that the aforementioned first disk unit receives read/write requests from the aforementioned host computer via the aforementioned switch. Each port of the aforementioned switch is assigned a physical port ID and a logical port ID. The aforementioned switch is provided with a table that maintains the correspondence relation between the physical port ID and the logical port ID. The second disk unit is connected to a port of the aforementioned switch that is different from the port connected to the aforementioned host computer and the port connected to the aforementioned first disk unit. Via the aforementioned switch, the aforementioned second disk unit obtains configuration information (the number of logical volumes and size of each logical volume, for example) of the aforementioned first disk unit. Then, the correspondence relation between the physical port ID and the logical port ID assigned to the port of the switch connected to the aforementioned first disk unit is exchanged with the correspondence relation between the physical port ID and the logical port ID assigned to the port of the switch connected to the aforementioned second disk unit. Concretely, the logical port ID assigned to the port of the switch connected to the aforementioned first disk unit and the logical port ID assigned to the port of the switch connected to the aforementioned second disk unit are exchanged. Consequently, even if the host computer attempts to access the aforementioned first disk unit, in actuality, the aforementioned second disk unit will be accessed. After this port ID switching process is performed, the aforementioned second disk unit is configured with the logical volume that corresponds to the configuration information of the aforementioned first disk, and data in the aforementioned first disk unit is migrated to the aforementioned second disk unit. If there is a read or write request from the aforementioned host computer for data already migrated to the aforementioned second disk unit, that processing is performed for that data by the aforementioned second disk unit. If there is a read or write request from the aforementioned host computer for data that has not yet migrated to the aforementioned second disk unit, that data is read from the aforementioned first disk unit into the aforementioned second disk unit and the processing is performed for that data by the aforementioned second disk unit.

Other data migration methods provided by this application are clarified with the preferred embodiments of the invention.

BRIEF DESCRIPTION OF THE DRAWINGS

FIG. 6 indicate an example configuration of the port configuration table of the present invention: FIG. 6(A) indicates an example configuration of the port configuration before port switching and FIG. 6(B) indicates an example configuration of the port configuration after port switching.

FIG. 8 indicates an example structure of the migration worktable of the present invention.

FIG. 14 indicates an example configuration of the port configuration table of the third preferred embodiment of the present invention.

DESCRIPTION OF THE PREFERRED EMBODIMENTS

Below, preferred embodiments 1 through 5 propose data migration methods and devices, well suited to a SAN environment.

Preferred Embodiment 1

In the present preferred embodiment, a new disk system is connected to a switch that is already connected to a host and an old disk system, and using that switch, data on the old disk system is migrated to the new disk system. Therefore, because with the present preferred embodiment, there is no need to perform the task of detaching the connection between the host and old disk system and connecting a new disk system to the host and old disk system, and it is only required to connect a new disk system to the switch, compared to the data migration system and method disclosed in the aforementioned U.S. Pat. No. 5,680,640, the work of adding a new disk system is reduced. Thus, the costs associated with data migration can also be suppressed. In addition, since it is unnecessary to provide a dedicated channel for data migration with the present preferred embodiment, hardware costs can also be reduced.

Below, the present preferred embodiment will be described using FIG. 1 through FIG. 10.

(1) System Configuration

Figure 1:
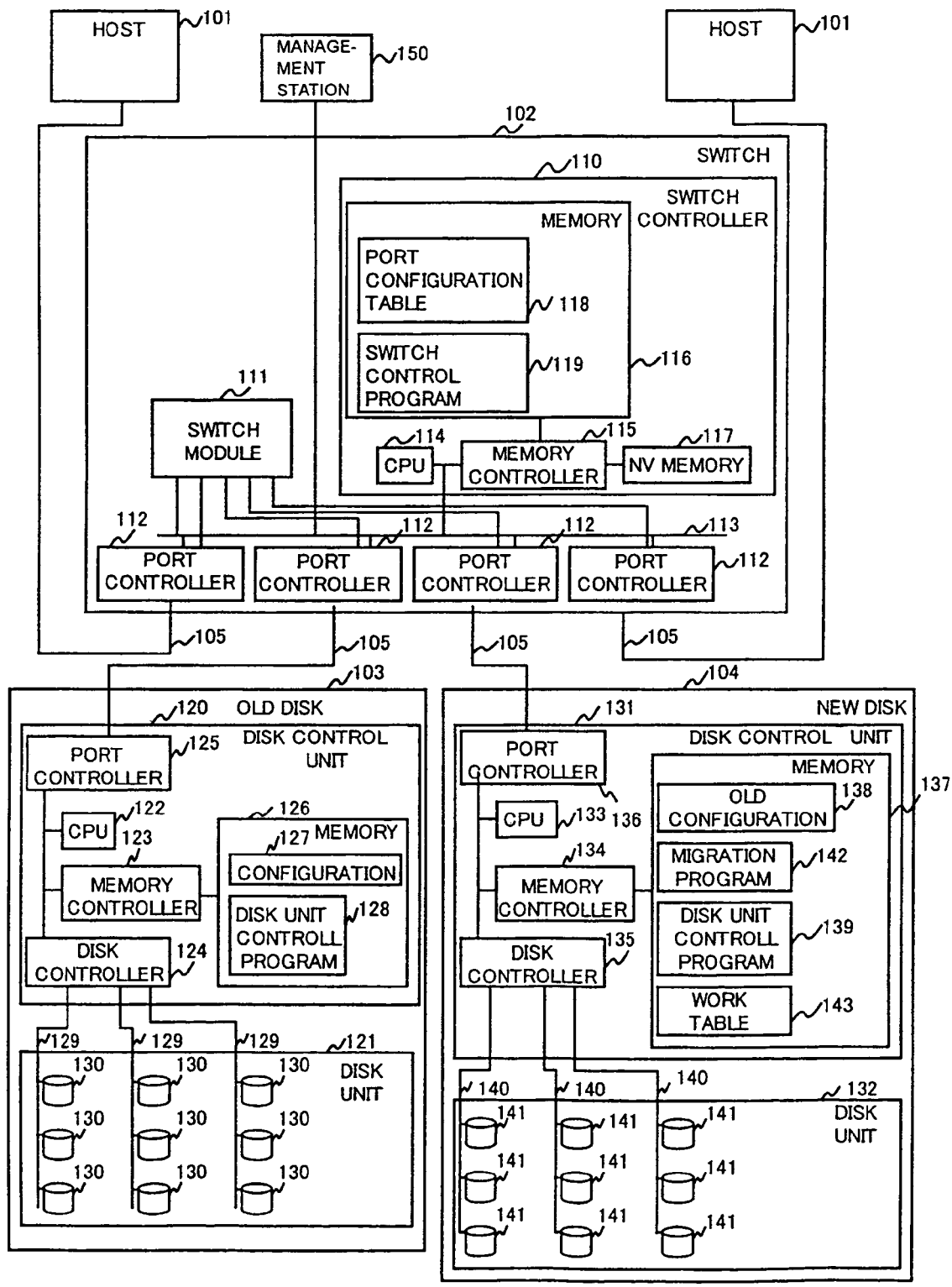
FIG. 1 is a diagram that describes the configuration of the computer system in the first preferred embodiment of the present invention.

FIG. 1 is a diagram that describes the first preferred embodiment of a computer system to which the data migration system and method of the present invention is applied. Two hosts 101, old disk system 103 and new disk system 104 are connected with switch 102, and these form a SAN. Hosts 101, old disk system 103 and new disk system 104 are connected to switch 102 with fiber channel 105. Since the present invention performs data migration from old disk system 103 to new disk system 104, there is no limitation on the number of hosts.

Figure 5:
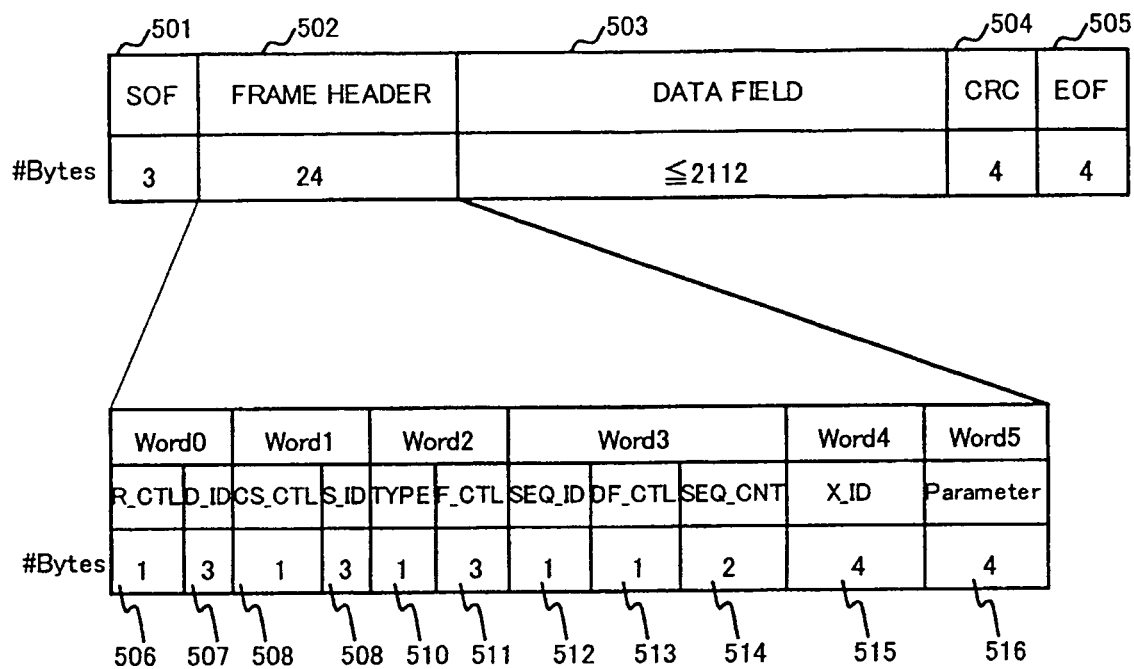
FIG. 5 is a diagram that describes the frame of the fiber channel.

FIG. 5 indicates the frame format that is used with fiber channel 105. Between SOF (Start Of Frame) 501 that indicates the beginning of the frame and EOF (End Of Frame) 505 that indicates the end, frame header 502, data field 503 and CRC (Cyclic Redundancy Check) 504 are inserted into the frame. Frame header 502 includes frame control information and contains receive side address D_ID (Destination_ID) 507, sending source address S_ID (Source ID) 508, R_CTL (Routing Control) 506 that controls the routing, TYPE 510 that indicates the data structure, F_CTL (Frame Control) 511 that controls the frame sequence and exchange, SEQ_ID (Sequence_ID) 512 that distinguishes between the sending source and receive side sequences, SEQ_CNT (Sequence count) 514 that indicates the count value of a number of frames of each sequence, and data field control information DF_CNTL (Data Field Control) 513. Details of the frame of fiber channel 105 are shown in ANSI X3.230 FC-PH (Fiber Channel Physical and Signaling Interface).

Figure 3:
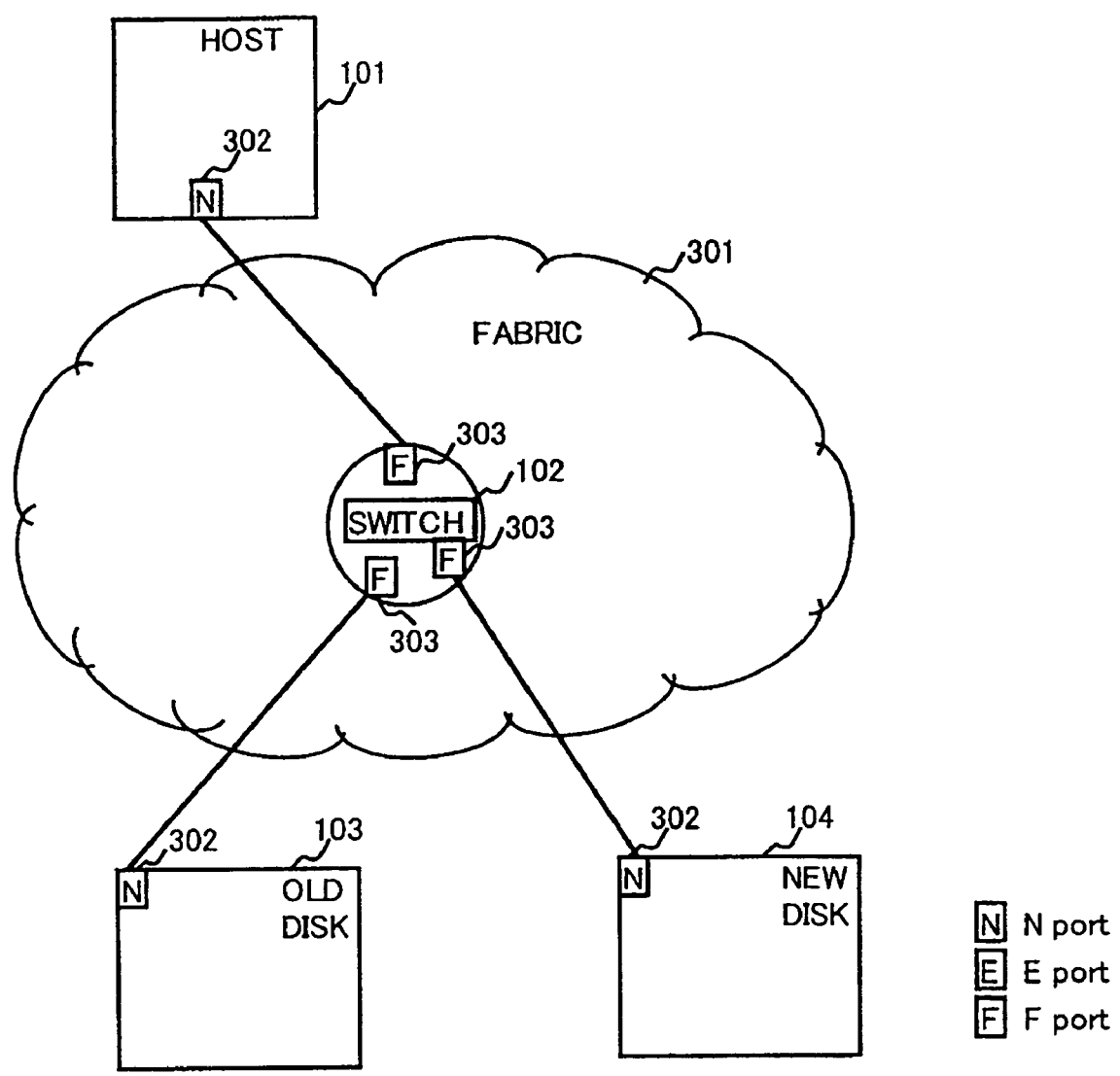
FIG. 3 is a diagram that describes the fabric configured with one switch.
Figure 4:
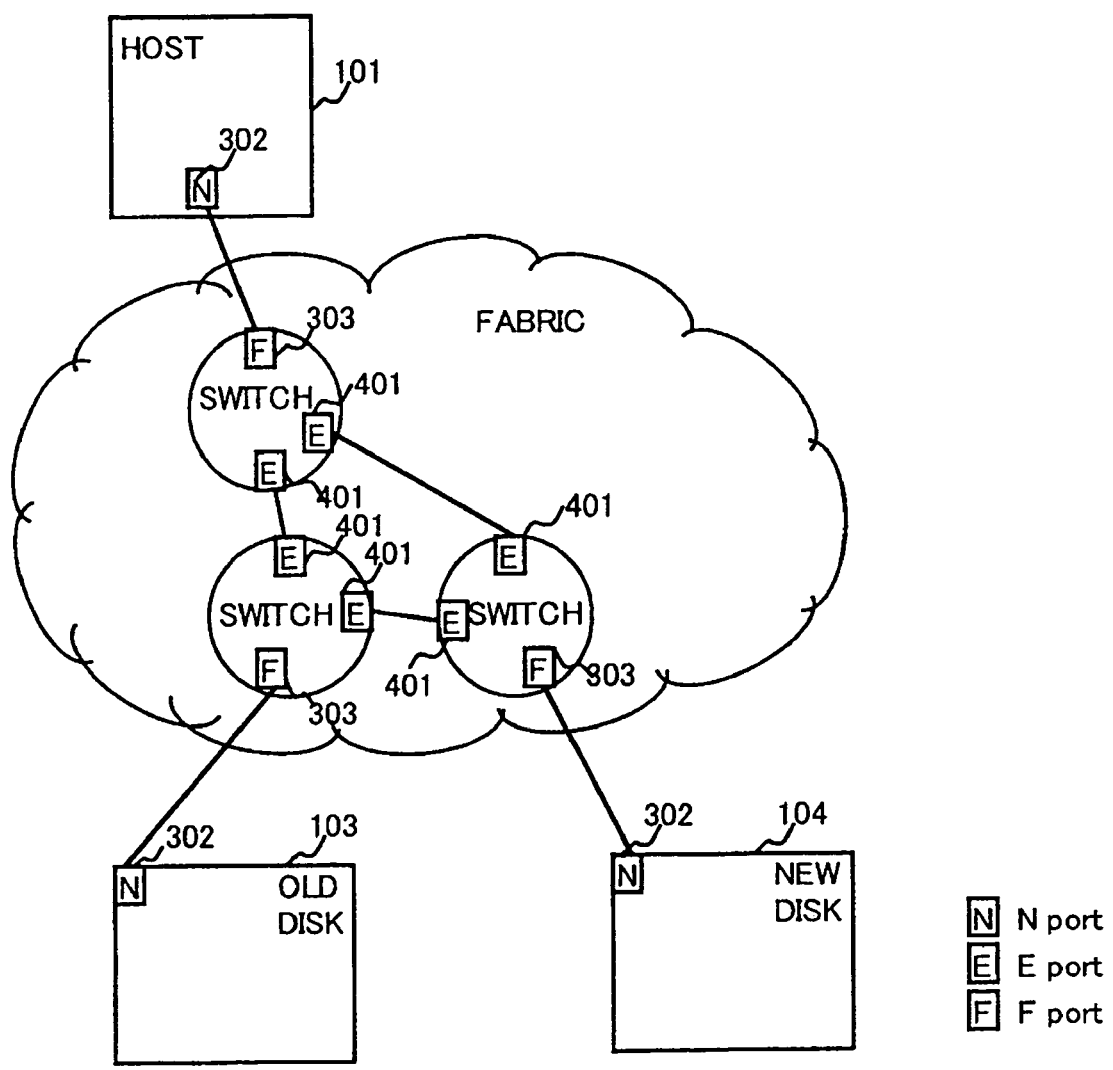
FIG. 4 is a diagram that describes the fabric configured with a plurality of switch es.

FIG. 3 indicates a logical network connection configuration of the computer system shown in FIG. 1. In this computer system, fabric 301 is configured with one switch 102. Port 303 of switch 102, used in the connection of host 101 and the disk units, is called the F (Fabric) port. Also, ports 302 of host 101 and the disk units are called N (Node) ports. As indicated in FIG. 4, fabric 301 can also be configured with a plurality of switches 102. The switch ports that connect to other switches are called the E (Expansion) ports 401.

In the case where the fabric is configured with a single switch 102 as in FIG. 3, data transfers from host 101 to new disk system 104 are performed as follows. Host 101 stores its own port ID in S_ID 508, stores the port ID of a frame's sending destination in D_ID 507, and then sends the frame. When switch 102 receives the frame, it examines the port ID which has been stored in D_ID 507 and sends the frame from the F_Port which matches that port ID to the N_Port of new disk system 104. S_ID 508 and D_ID are logical port IDs.

Further, as shown in FIG. 4, in the case where fabric 301 is configured from a plurality of switches 102, data transfers from host 101 to new disk system 104 are performed as follows. When switch 102 that is directly connected to host 101 receives a frame from host 101, it examines the port ID which has been stored in D_ID 507. However, because that switch does not have the F_Port which matches that port ID, it sends the frame from an E_Port to another switch. Next, the switch that has the F_Port which matches that port ID and is directly connected to new disk system 104 sends the frame from that F_Port to the N_Port of new disk system 104. The data transfers from host 101 to new disk system 104 have been described above as an example, but data transfers are performed in the same manner among other devices.

Again, referencing FIG. 1, the configurations of switch 102, old disk system 103, new disk system 104 and host 101 will be described in this order.

(A) Switch 102 Configuration

Switch 102 includes switch controller 110, switch module 111 and port controller 112.

Switch controller 110 performs control within switch 102 and includes CPU 114, memory controller 115, memory 116 and nonvolatile memory 117.

CPU 114, using internal bus 113, performs the exchange of control information and data with each controller.

The read/write access to nonvolatile memory 117 is controlled by memory controller 115, and it stores such data as switch control program 119 which is necessary for the control of switch 102 and port configuration table 118 which is necessary during execution of that program.

FIG. 6 indicates an example configuration of port configuration table 118. FIG. 6 (A) shows a port configuration table before port switching, and FIG. 6(B) shows a port configuration table after port switching. The port switching procedure will be described later.

Figure 20:
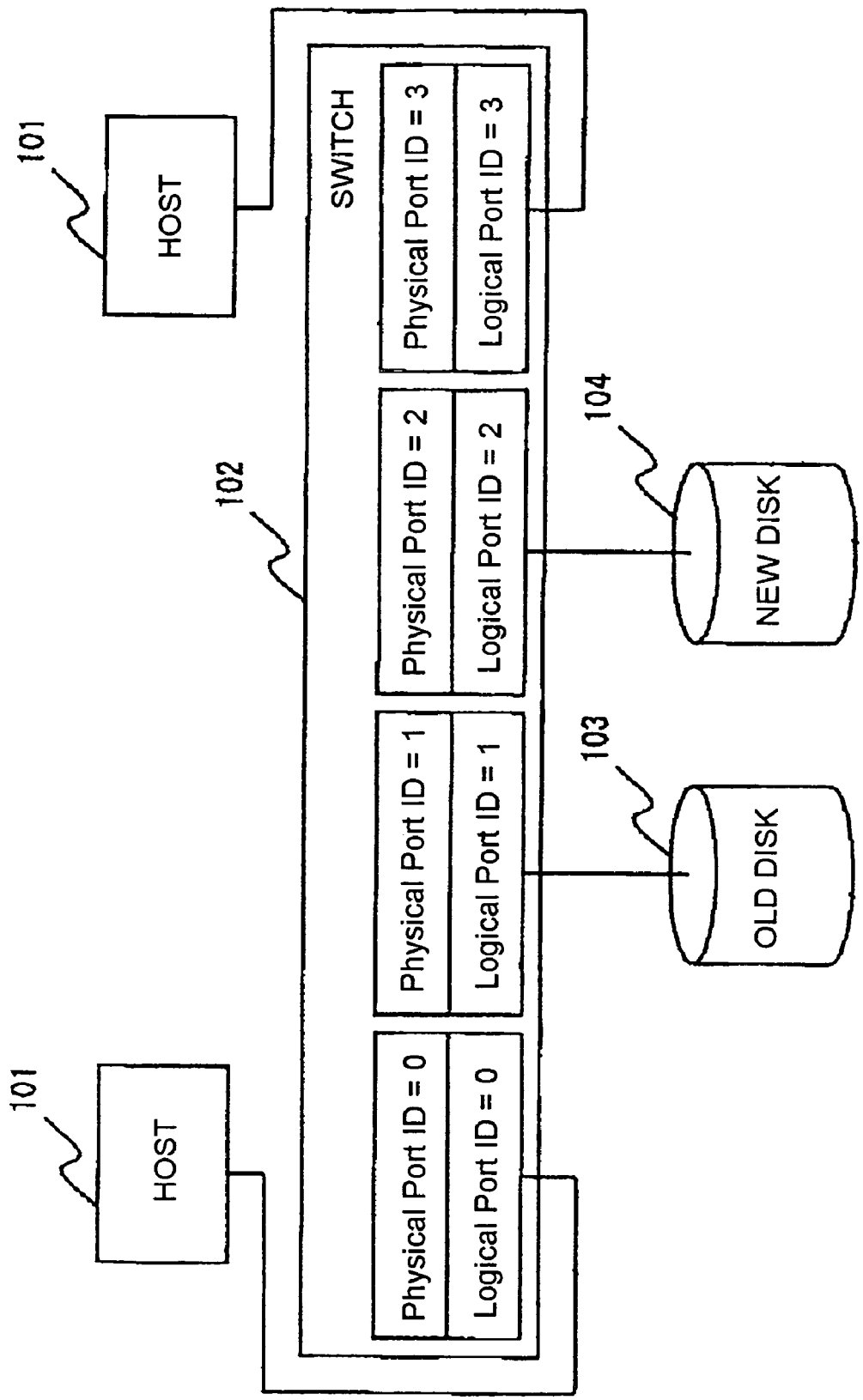
FIG. 20 is a diagram that describes the correspondence between the physical port ID and logical port ID assigned to each port prior to the port switching procedure of the present invention.

Port configuration table 118 indicates the port configuration, and includes logical port ID 601 that indicates the logical port ID and physical port ID 602 that indicates the physical port ID. In addition, it may also include the rule of the transfer service class of the fiber channel and the port type such as loop. In the present preferred embodiment, as indicated in FIG. 20, it is assumed that a host 101 is connected to logical port ID_0, old disk system 103 is connected to logical port ID_1, and a host 101 is connected to logical port ID_3. Also, it is assumed that new disk system 104 is connected to logical port ID_2.

The read/write access to memory 116 is controlled by memory controller 115. When switch control program 119 is executed by CPU 114, that program is read from nonvolatile memory 117 and stored in memory 116. Further, at that time and as necessary, CPU 114 also reads port configuration table 118 from nonvolatile memory 117 and stores it in memory 116.

Port controller 112 performs control of the data coding/compounding. Concretely, port controller 112 extracts serial data from a received fiber channel frame and converts it into parallel data, and extracts information necessary for switching such as the send destination ID from the frame and sends it to switch module 111. Also, port controller 112 performs the reverse procedure.

Switch module 111 has a plurality of ports that are individually connected to a plurality of port controllers 112. Switch module 111 is connected to CPU 114 via internal bus 113 and is controlled by CPU 114. When switch module 111 receives data from port controller 112, in accordance with the send destination ID of that data, it switches a port to the output port and sends data. Switch module 111 may be made with a crossbar switch.

Management station 150, connected to switch 102, sets the various parameters of switch 102, and performs control of the migration process which is the most characteristic function of the present preferred embodiment and information management. Further, management station 150 has the command to active the migration program (to be described later) on new disk system 104 and the command to acquire migration information (such as migrating, done, or error).

Figure 22:
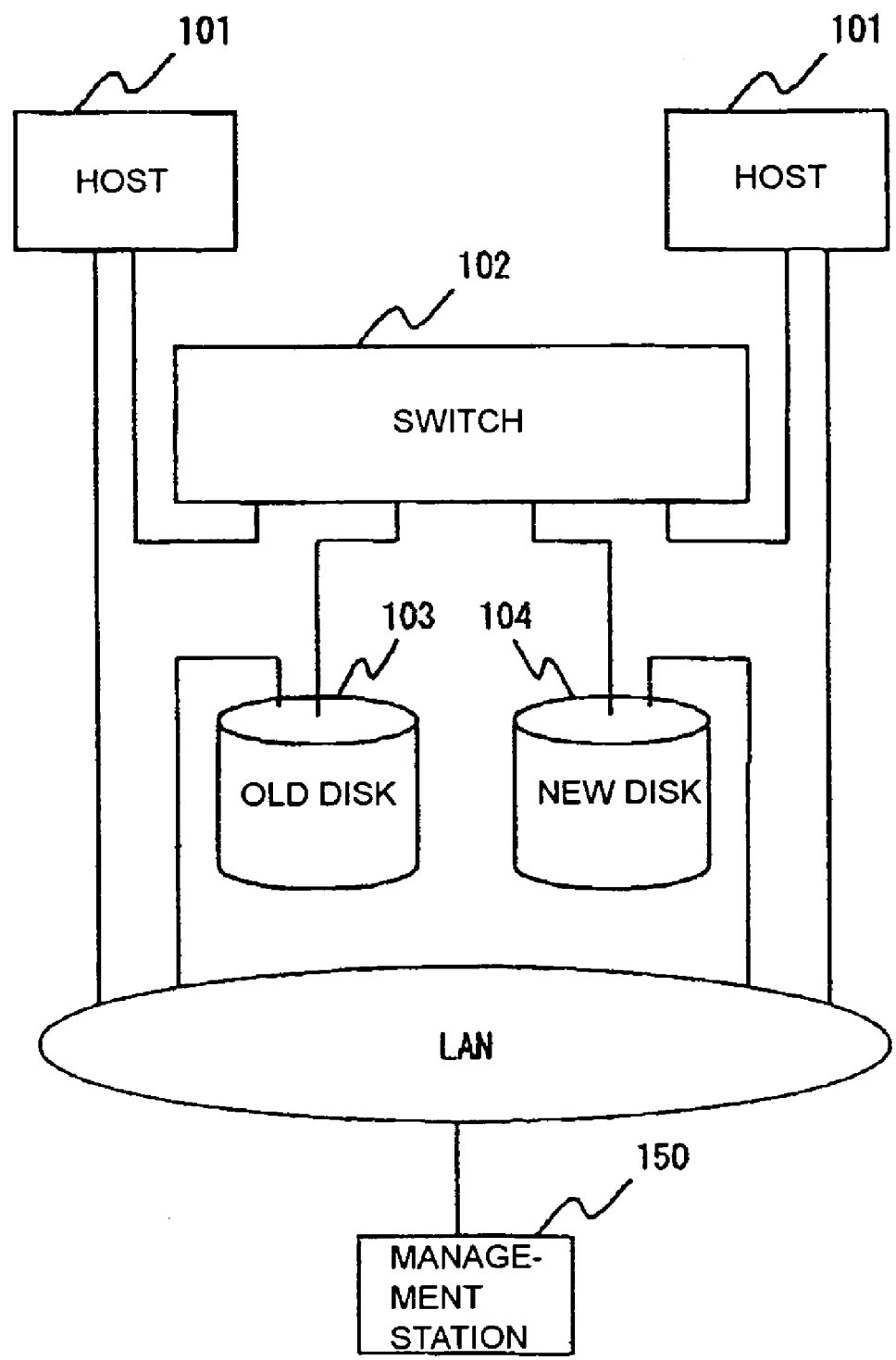
FIG. 22 is an example configuration of the case where the management station of the present invention is connected to a LAN.

In FIG. 1, management station 150 is directly connected to switch 102. However, as shown in FIG. 22, the aforementioned settings may be implemented with the Web or other means, by connecting host 101, switch 102, old disk system 103, new disk system 104 and management station 150 to a LAN (Local Area Network).

(B) Old Disk System 103 and New Disk System 104 Configurations

In present preferred embodiment, in order to simplify the description, old disk system 103 and new disk system 104 are assumed to have the same configuration, except for programs and information in memory.

Old disk system 103 includes disk control unit 120 and disk unit 121.

Disk unit 121 includes a plurality of disk drives 130. These disk drives 130 are connected to disk controller 124 with interface (I/F) 129 (fiber channel, SCSI, etc.). In the implementation of the present invention, the number of disk drives 130 is not restricted.

Disk controller 120 includes CPU 122, memory controller 123, port controller 125, disk controller 124 and memory 126. CPU 122, memory controller 123, port controller 125 and disk controller 124 are connected with an internal bus.

CPU 122, using the internal bus, performs the exchange of control information and data with these controllers. CPU 122 issues read and write commands to disk drive 130 that is necessary in the processing of commands sent from host 101 via switch 102. CPU 122 constructs the well-known RAID 0–5 configuration with a plurality of disk drives 130, and provides logical volumes for host 101.

Port controller 125 is connected to port controller 112 of switch 102 by fiber channel 105 and has the same functions as port controller 112.

Memory 126 is connected to memory controller 123 and stores disk unit control program 128 that controls the disk unit, data that are necessary during execution of said program, and configuration information 127. Configuration information 127 will be described later. Disk unit control program 128 is executed by CPU 122 and is a program that controls port controller 125 and disk controller 124, and processes read/write commands received from host 101.

As described above, except for the program and information in memory 137, the configuration elements of new disk system 104 are the same as the configuration elements of old disk system 103. Therefore only the program and information in memory 137 will be described. Stored in memory 137 is old configuration information 138 which has been read and transferred from configuration information 127 stored in memory 126 of old disk system 103, migration program 142 used during data migration, and migration worktable 143 that indicates the state of the data migration.

FIG. 8 indicates an example structure of migration worktable 143. Migration worktable 143 includes volume number 801, slot number 802 and status 803 that indicates the status of said slot.

(C) Host 101 Configuration

Figure 2:
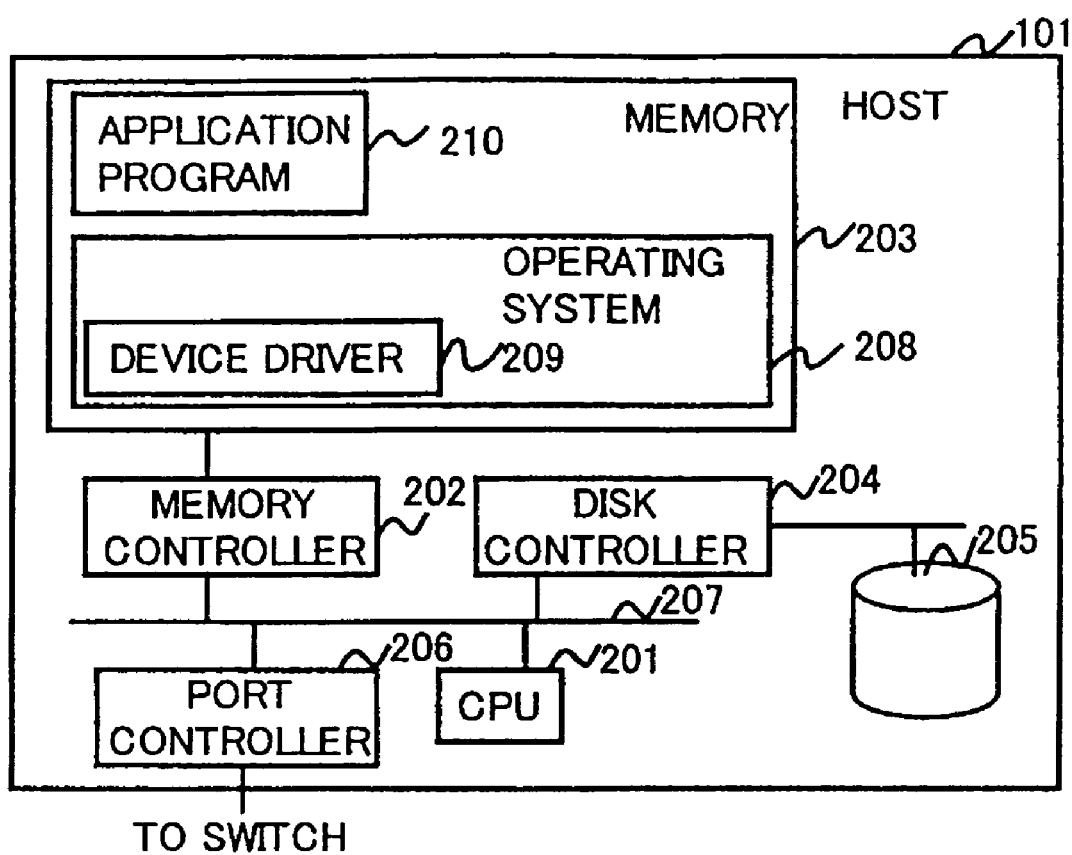
FIG. 2 is a diagram that describes the configuration of the host.

FIG. 2 indicates the configuration of host 101. Host 101 includes CPU 201, memory controller 202, port controller 206, disk controller 204, disk drive 205 and memory 203.

CPU 201, memory controller 202, port controller 206 and disk controller 204 are connected with internal bus 207. CPU 201, using internal bus 207, performs the exchange of control information and data with these controllers.

Port controller 206 is connected to port controller 112 of switch 102 with fiber channel 105 and performs the exchange of commands and data with port controller 112.

Disk drive 205 is connected to disk controller 204 and stores operating system 208, device driver 209 that controls hardware such as port controller 206, application program 210 and data that is necessary during execution of these programs.

Memory 203 is connected to memory controller 202. When operating system 208, disk controller 204, device driver 209, application program 210, etc. are executed by CPU 201, they are read from disk drive 205 and stored in memory 203.

(2) Data Migration Procedure Flow

Figure 9:
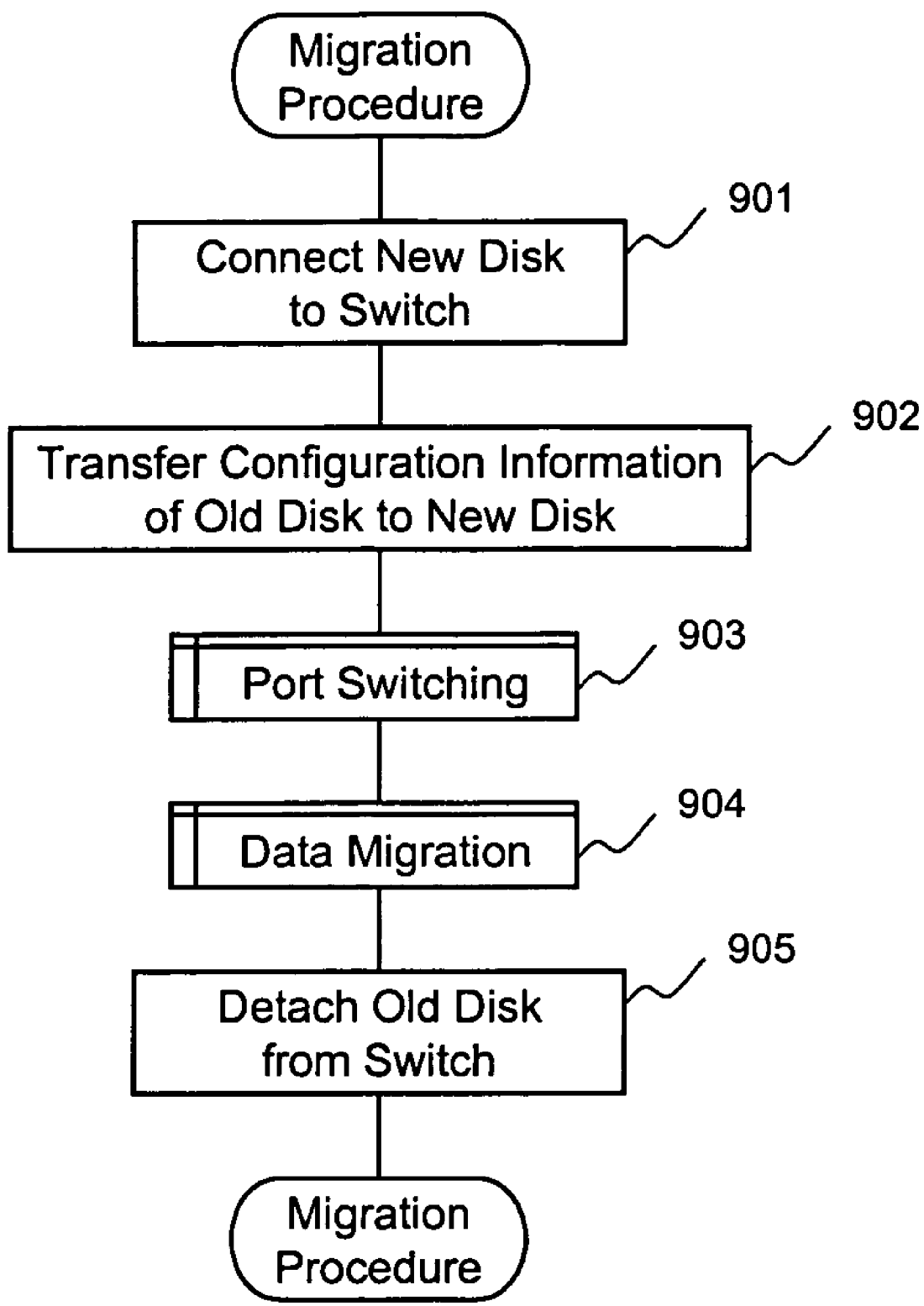
FIG. 9 is a flowchart of the data migration procedure of the present invention.

Next, referencing FIG. 9, the data migration procedure of the present invention will be described. It is assumed that host 101 and old disk system 103 have been already connected to switch 102.

(A) Connect New Disk System to Switch (901)

First, an operator activates management station 150 and then inputs the port numbers of switch 102 that are connected to old disk system 103 and new disk system 104.

Next, the operator connects new disk system 104 to switch 102. At this point in time, if the port ID of new disk system 104 is a port ID other than a port ID already in use, any port ID may be assigned. When each port of switch 102 is assigned a port ID by default, the port ID assigned to the F_Port connected to new disk system 104 is appropriate. In the present preferred embodiment, as described above, logical port ID_2 is assigned to new disk system 104.

Because the logical port ID assigned to new disk system 104 is different from logical port ID_1 of the disk unit that can be used by host 101, at this point in time, host 101 cannot access new disk system 104.

(B) Transfer Configuration of Old Disk System to New Disk System (902)

After connecting new disk system 104, the operator activates migration program 142 on new disk system 104 with the aforementioned command from management station 150. The activated migration program 142 first obtains configuration information 127 from old disk system 103 (902).

Figure 7:
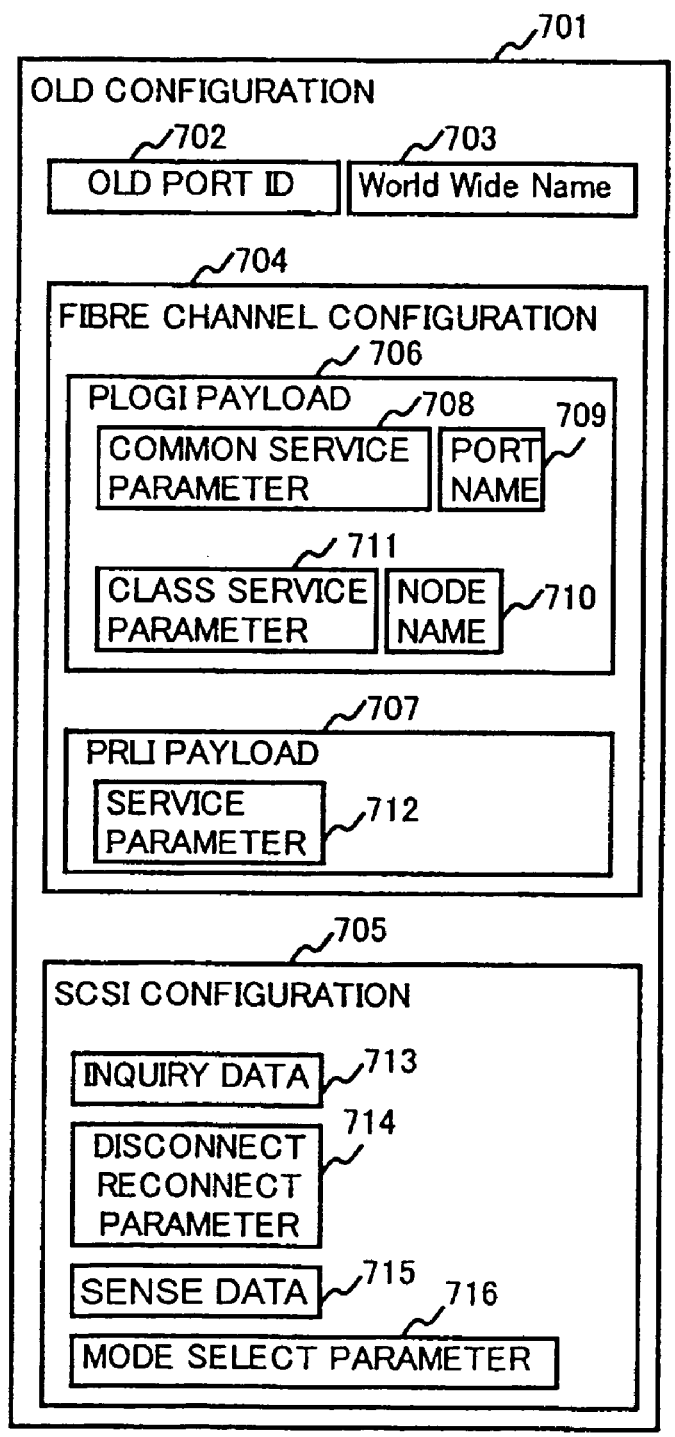
FIG. 7 indicates an example configuration of the old configuration information of the present invention.

As indicated in FIG. 7, configuration information 127 includes old port ID 702, world wide name 703, fiber configuration information 704 and SCSI configuration information 705.

Fiber configuration information 704 includes PLOGI payload 706 and PRLI payload 707.

PLOGI payload 706 includes common service parameter 708 that are exchanged at the time of a fiber channel N_Port login (PLOGI), port name 709, node name 710 and class service parameter 711. Specified in common service parameter 708 are the fiber channel version information and functions such as the address specification method supported by said fiber channel device, the communication method, etc. Class service parameter 711 indicates the class support information, X_ID re-assignment, ACK capability, etc. Details of fiber channel parameters are described in the aforementioned ANSI X3.230 FC-PH. PRLI payload 707 includes service parameter 712.

SCSI configuration information 705 includes inquiry data 703, disconnect/reconnect parameter 714, sense data 715 and mode select parameter 716. Inquiry data 713 indicates the type, vendor ID, product ID, etc. of the SCSI device. Disconnect/reconnect parameter 714 indicates the connection conditions. When an error occurs, sense data 715 is exchanged to investigate the state of the disk unit. Mode select parameter 716 performs the setting and modification of various parameters related to the physical attributes of the SCSI device, data format of the storage media, error recovery method and procedure, processing method of an I/O process, etc. By means of inquiry data 713 and mode select parameter 716, the number of volumes and size of each volume (number of blocks) on old disk system 103 can be learned. A detailed description of the protocol for SCSI on fiber channel 105 is shown in ANSI X.269 Fiber Channel Protocol for SCSI.

As described above, configuration information 127 can also exist as information in addition to that which can be acquired using protocols of the existing fiber channel, SCSI, etc. If that type of configuration information exists, the operator directly reads configuration information 127 from old disk system 103 and transfers it to new disk system 104.

Reading and transferring are performed from an operation panel or by web access by means of HTTP.

When the transfer of configuration information 127 to new disk system 104 is completed, or in other words, when the transfer of old configuration information 138 is completed, migration program 142 of new disk system 104 notifies switch 102 of that fact.

(C) Port Switching Procedure (903)

When switch control program 119 of switch 102 receives that notification, the port switching procedure is started.

Figure 10:
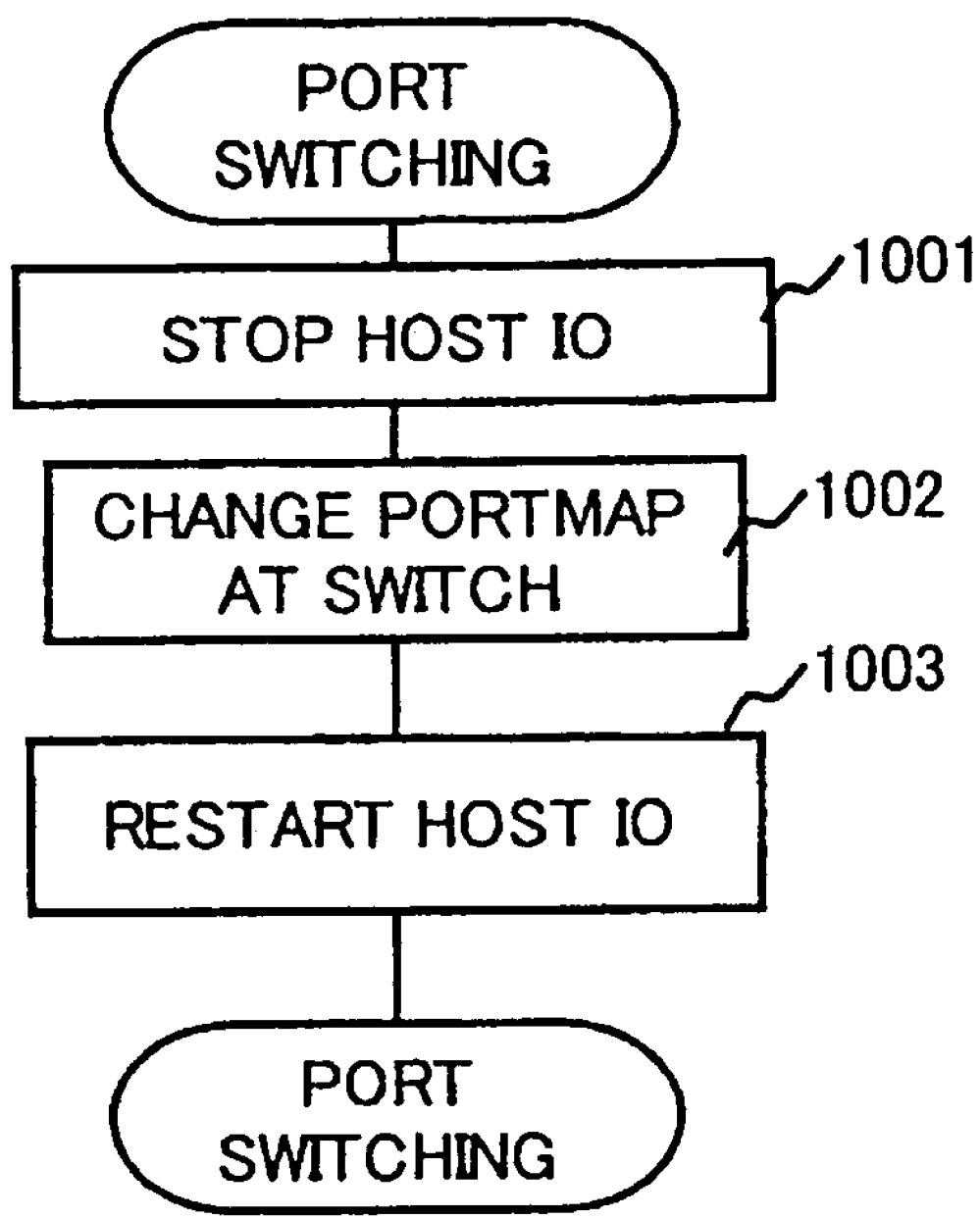
FIG. 10 is a flowchart of the port switching procedure of the present invention.

Details of the port switching procedure are described using the flowchart of FIG. 10.

Initially, the case as indicated in FIG. 3 where fabric 301 is configured with a single switch 102 will be described.

First, switch control program 119 of switch 102 notifies all hosts 101 using old disk system 103 that port switching has begun. Device driver 209 of host 101 that has received this notification queues an I/O process for old disk system 103 in memory 203 of host 101 (1001).

Figure 21:
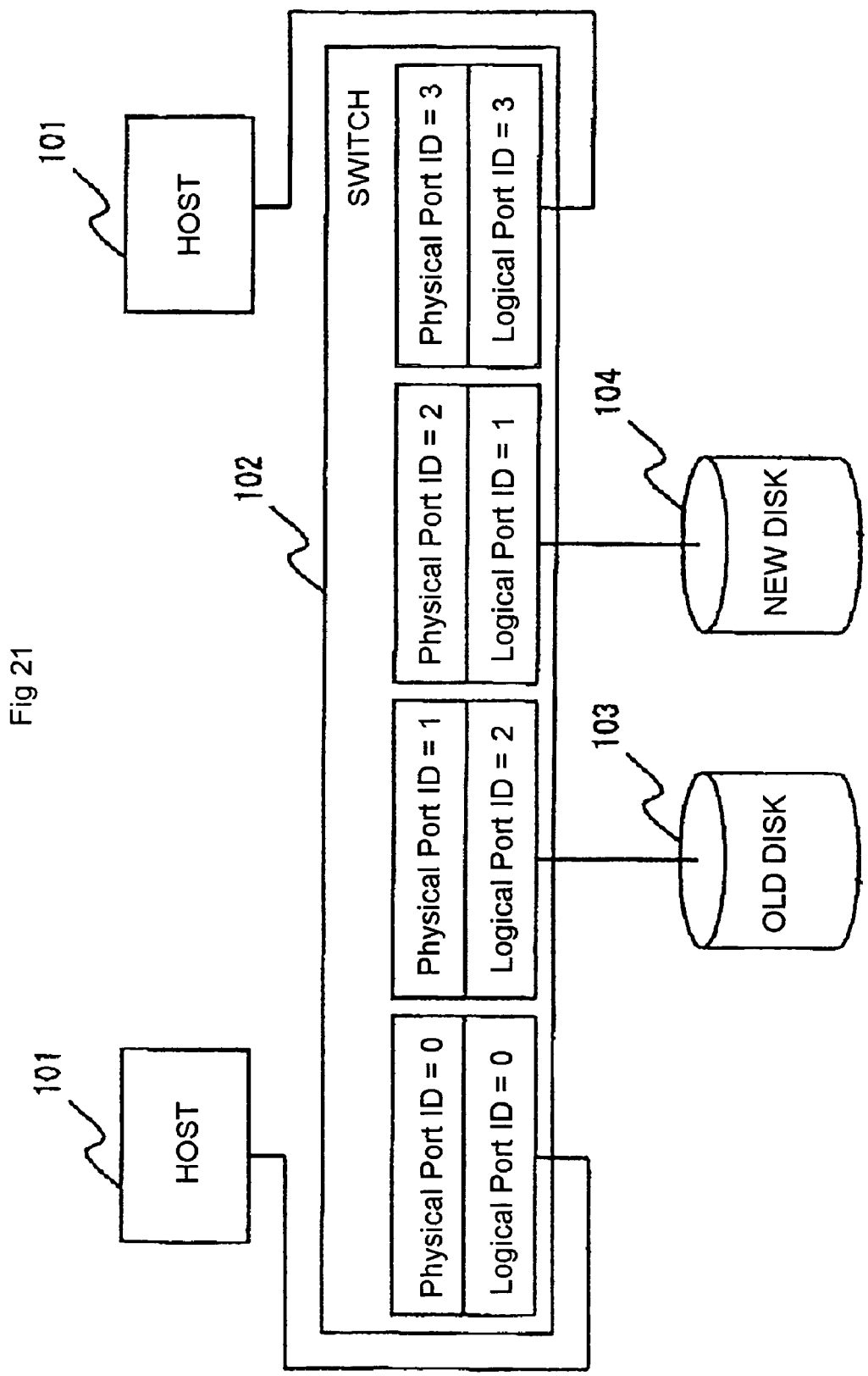
FIG. 21 is a diagram that describes the correspondence between the physical port ID and logical port ID assigned to each port after the port switching procedure of the present invention.

When an I/O process for old disk system 103 is suspended, device driver 209 notifies switch 102 of the I/O suspension completion. If an I/O process for old disk system 103 is being executed, it may be terminated, but it is desirable to allow the execution to finish and then issue notification of the I/O suspension completion. After receiving such notification from all hosts 101, switch control program 119 of switch 102 changes the correspondence relation between logical port ID 601 and physical port ID 602 of old disk system 103 and the correspondence relation between logical port ID 601 and physical port ID 602 of new disk system 104 of port configuration table 118 (1002). In other words, port configuration table 118 is rewritten as in FIG. 6(B). Using diagrams of the whole computer system, this situation can be illustrated as the change from the state indicated in FIG. 20 to the state indicated in FIG. 21.

Thereafter, by means of referencing port configuration table 118 at each frame transmission or reception, port controller 112 of switch 102 performs the port switching procedure by manipulating S_ID 508 and D_ID 507. When a frame is received, logical port ID 601 that corresponds to S_ID 508 of the frame is retrieved, and S_ID 508 of the frame is converted into physical port ID 602 that corresponds to the retrieved logical port ID 601. Similarly, when a frame is transmitted, logical port ID 601 that corresponds to D_ID 507 of the frame is retrieved, and that D_ID 507 is converted into physical port ID 602 that corresponds to the retrieved logical port ID 601. At this time, CRC 504 that is appended to the frame is recalculated. By means of the above procedure, all frames to old disk system 103 are sent to new disk system 104. Further, frames sent from new disk system 104 are viewed by host 101 as being sent from old disk system 103. After port switching by switch 102, host 101 I/O is restarted (1003).

Next, as indicated in FIG. 4, the case where fabric 301 is configured with a plurality of switches 102 will be described.

First, switch 102 which will become the master (master switch) is determined. In the present preferred embodiment, the master switch is switch 102 that is directly connected to new disk system 104.

Switch control program 119 of the master switch notifies all hosts 101 that are using old disk system 103 and all switches except for the master switch in fabric 301 of the starting of port switching. The processing to be performed by device driver 209 of host 101 that has received such notification is the same as in the case where the fabric is configured from a single switch 102, except for notification to the master switch of the I/O suspension completion.

After such notification is received from all hosts 101, switch control program 119 of the master switch changes the correspondence relation between logical port ID 601 and physical port ID 602 of old disk system 103 and the correspondence relation between logical port ID 601 and physical port ID 602 of new disk system 104 of port configuration table 118, and notifies all switches 102 except the master switch of that change. Based on such notification, all switches except for the master switch change their own port configuration table 118. Thereafter, the operation of each switch is the same as the operation of switch 102 in the case where the fabric is configured with a single switch 102. After port switching has been performed by all switches 102 in fabric 301, host 101 I/O is restarted.

(D) Data Migration Procedure (904)

The data migration procedure is performed synchronously with the completion of the port switching procedure. This data migration procedure will be described using the flowchart of FIG. 11.

First, migration program 142 constructs a volume in new disk system 104 that corresponds to the logical volume number and size of that volume in old disk system 103, and then initializes variables to be used and migration worktable 143 that was described with FIG. 8 (1101).

Migration program 142 on new disk system 104 checks whether there is an I/O request from host 101 (1102).

If there is no I/O request from host 101, data is migrated in slot units from old disk system 103. At that time, using migration worktable 143, migration program 142 computes the address of the next data to migrate (1103).

Data migration is performed for all the logical volumes of old disk system 103 in order of increasing volume number 801. Further, within each volume, data migration is performed beginning with the first block. Worktable 143 for migration shown in FIG. 8 indicates the next migration address in the volume number 801 cell of the first row. The initial value of the next migration address is the first block address of the smallest volume number 801. Moreover, migration worktable 143 indicates the next migration slot in the slot number 802 cell of the first row. From the second row onward, the rows are arranged in order of increasing volume number 801 and slot number 802. When migration program 142 transfers data of the next migration address obtained from migration worktable 143, it changes status 803 of that slot number to "Migrating" (1104).

Next, using port controller 125, migration program 142 issues a request to read the slot size to old disk system 103 and acquires the corresponding data (1105).

Migration program 142 writes the data obtained from old disk system 103 to a corresponding volume of new disk system 104 on disk drive 141, using disk controller 124 and via I/F 140 (1106).

After the data is written on disk drive 141, it is checked whether the migration of all slots of the corresponding volume is completed. If completed, data migration of the next volume is executed. If not completed, the slot number is incremented (1107).

If the migration of all volumes is completed, the migration procedure is finished (1108).

Next, the case of an I/O request from host 101 will be described. If there is an I/O request from host 101, migration program 142 investigates whether the request is for a read or write access (1109).

In the case of a read request, migration program 142 references migration worktable 143 and investigates whether migration of the requested data has been completed (1110).

If the migration is completed, migration program 142 reads that data from disk drive 141 in new disk system 104 and sends it back to host 101 (1113, 1112).

If the migration of the data requested from host 101 is not complete, using port controller 125, migration program 142 issues a read request to old disk system 103 via switch 102 and acquires said data. Migration program 142 sends back the data acquired from old disk system 103 to host 101 and also writes that data to the corresponding volume of new disk system 104 (1111, 1112).

After said data is written on disk drive 141, said data is registered into migration worktable 143, and with status 803 set to "Done", the processing of said request is finished (1108).

Next, the case of a write request from host 101 will be described. Migration program 142 receives data related to the write request from host 101 (1114).

Then, using port controller 125, migration program 142 issues a read request in slot size units to old disk system 103 via switch 102 so as to include the data requested from host 101, and acquires the data. After migration program 142 overwrites the data obtained from the migration source with the data received from host 101 and creates new slot data, it writes to the volume in new disk system 104 requested by host 101 (1115).

After the write is completed, migration program 142 registers said slot into migration worktable 143, and with status 803 set to "Done", the processing related to the write request from host 101 is finished (1107).

(E) Detach Old Disk System (905)

After the data migration procedure is completed, the operator detaches old disk system 103 from the switch and terminates the migration procedure (905).

The system configuration and flow of the data migration procedure have been described above for preferred embodiment 1. By means of the present preferred embodiment, I/O requests from the host are only suspended during the time while configuration information of old disk system 103 is being transferred to new disk system 104 and during the time while the port switching procedure is being performed. Therefore, by means of the present preferred embodiment, because there is no need to perform the task of connecting a new disk system to the host and old disk system, by detaching the connection between the host and old disk system, the time while I/O requests from the host are suspended is shorter than the time while I/O requests from the host are suspended in the data migration system and method disclosed in U.S. Pat. No. 5,680,640. Consequently, the costs associated with data migration can be suppressed. Moreover, by means of the present preferred embodiment, since there is no need to provide a dedicated channel for data migration, hardware costs can also be suppressed.

Preferred Embodiment 2

The present preferred embodiment differs from preferred embodiment 1 in that in addition to the system configuration described with preferred embodiment 1, the old disk system and new disk system are directly connected with an interface (fiber channel or SCSI, for example). In the present preferred embodiment, since data migration is performed using that interface, compared to preferred embodiment 1, high-speed data migration can be performed. In the present preferred embodiment, it is necessary to provide an interface for data migration. However, there is no need to perform the task of connecting a new disk system to the host and old disk system, by detaching the connection between the host and old disk system, and because it is only required to connect a new disk system to the switch and connect the old disk system and the new disk system with an interface, compared to the data migration system and method disclosed in the aforementioned U.S. Pat. No. 5,680,640, the work of adding the new disk system is reduced.

Below, the present embodiment will be described using FIG. 12.

Figure 12:
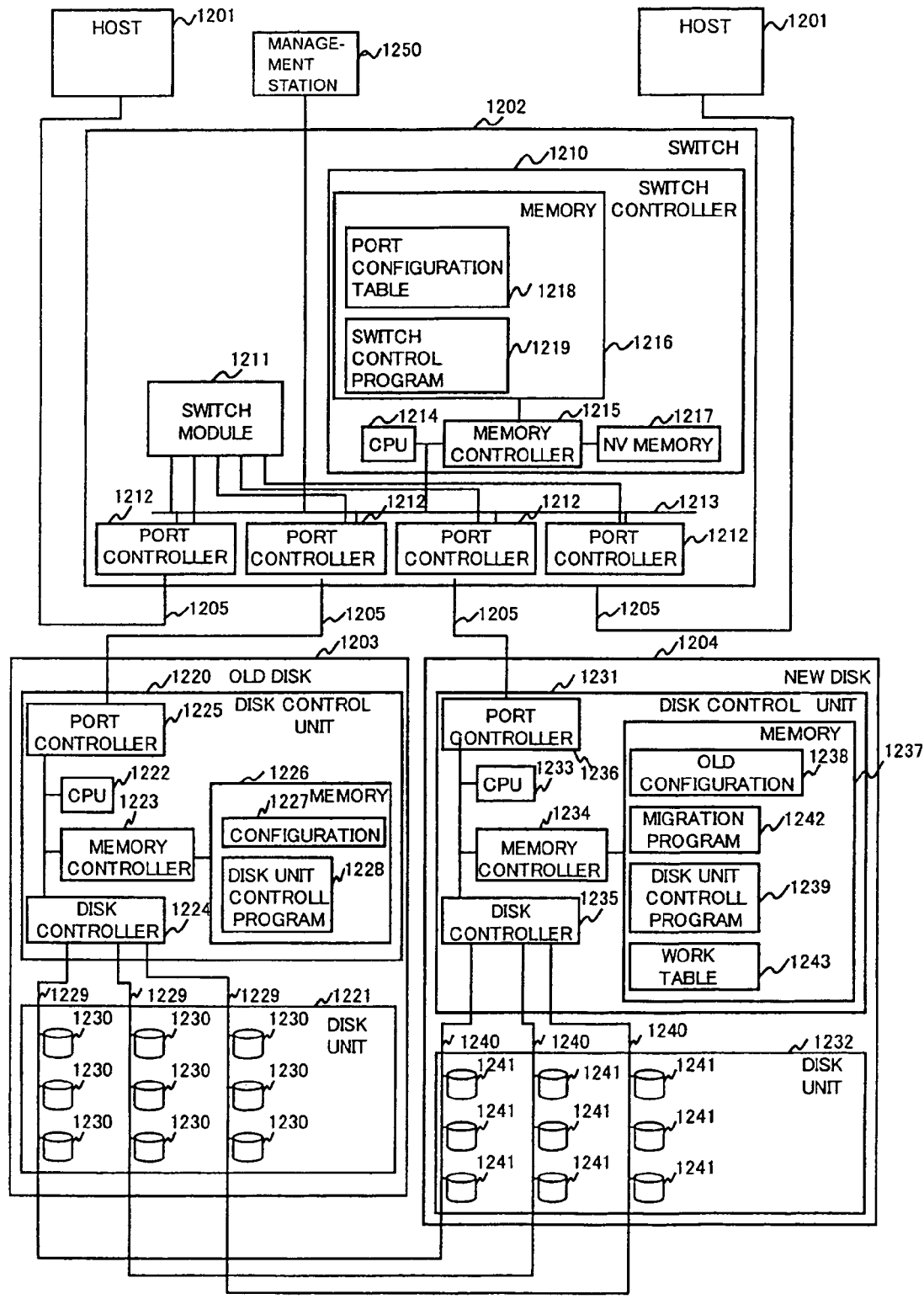
FIG. 12 is a diagram that describes the configuration of the computer system in the second preferred embodiment of the present invention.

FIG. 12 is a diagram that describes the second preferred embodiment of a computer system that has adopted the data migration system and method of the present invention. As described above, each configuration element of the computer system is the same as each configuration element of FIG. 1, and therefore their descriptions are omitted.

Below, the flow of the data migration procedure in the present preferred embodiment will be described. The data migration procedure flow is the same as that of preferred embodiment 1, which was described with FIG. 9. However, in the present preferred embodiment, since old disk system 1203 and new disk system 1204 are connected directly by a interface and data migration is performed using that interface, it is necessary to obtain the correspondence relation between the logical address and physical address in old disk system 1203 from old configuration information 1238. Below, only this point of difference will be described.

Figure 11:
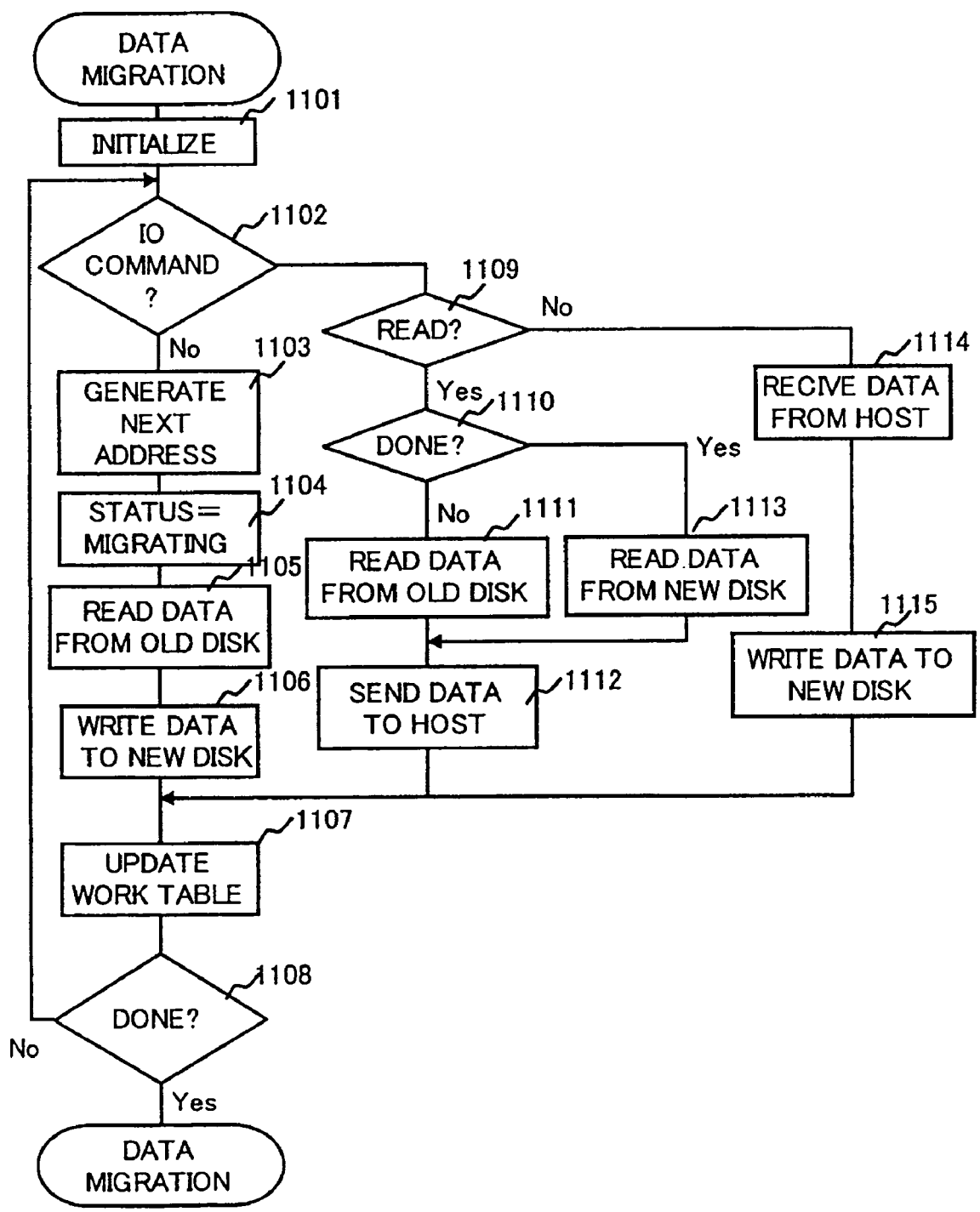
FIG. 11 is a flowchart of the data migration procedure of the present invention.

In steps 1105, 1113 and 1115 of FIG. 11, data is read from the old disk system via switch 102. However, in the present preferred embodiment, using information that is included in old configuration information 1238, migration program 1231 computes the physical address corresponding to the logical address of the data that should be read from old disk system 1203. Then, using I/F 1240, migration program 1231 issues directly a read request to disk drive 1230 of old disk system 1203 that corresponds to the computed physical address, and acquires that data. At this time, if that data has been distributed to a plurality of disk drives 1230 of old disk system 1203, or if stored in dispersed physical addresses, a plurality of read requests will be issued.

In the present preferred embodiment, since old disk system 1203 and new disk system 1204 are connected directly with an interface, and data migration is performed using that interface without passing through switch 1202, compared to preferred embodiment 1, high-speed data migration can be performed. Further, since the data migration of the present preferred embodiment does not pass through switch 1202, the resource consumption of the switch can be suppressed. In the present preferred embodiment, two hosts and two disk units are connected to switch 1202. However, because many hosts and disk units are connected in a SAN environment, those resources can be allocated to the data transfer between other hosts and other disk units. Therefore, by means of the present preferred embodiment, compared to preferred embodiment 1, the degradation of switch performance that accompanies data migration can be suppressed.

Preferred Embodiment 3

The present preferred embodiment differs from preferred embodiment 1 in that the migration program is executed by a switch.

By means of the present preferred embodiment, since it is unnecessary for a disk unit to have a migration program, data migration from an old disk system is possible even with a disk unit that does not have this type of program.

Figure 13:
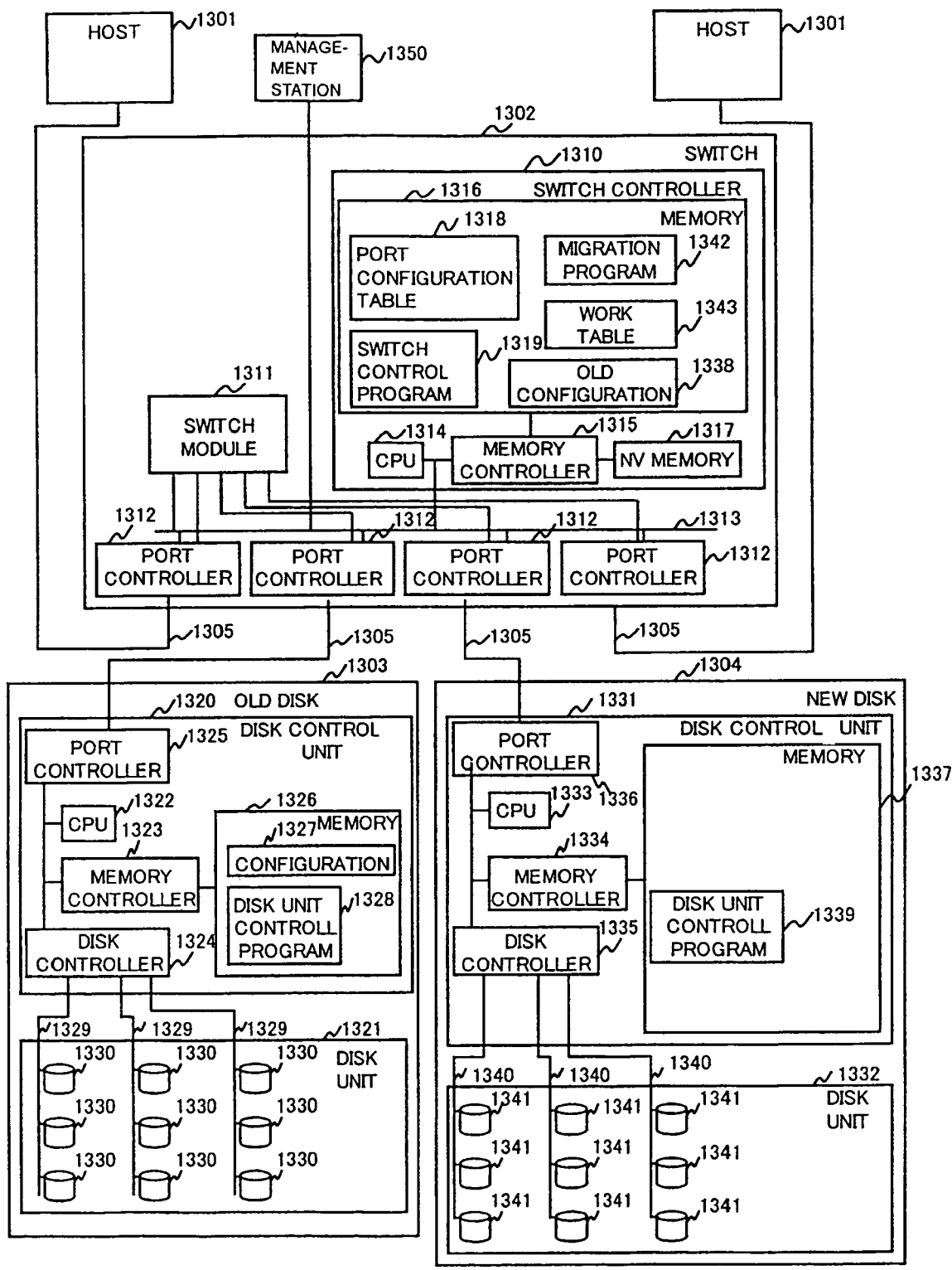
FIG. 13 is a diagram that describes the configuration of the computer system in the third preferred embodiment of the present invention.

Using FIG. 13, the configuration of the computer system of the present preferred embodiment will be described. However, a description of those configuration elements that are the same as configuration elements of FIG. 1 will be omitted.

In the present preferred embodiment, non-volatile memory 1317 in switch 1302 stores switch control program 1319 that is necessary for control of switch 1302, migration program 1342 that performs the migration procedure, port configuration table 1318 that is necessary during execution of these programs, old configuration information 1327 and migration worktable 1343. Disk unit control program 1339 is stored in memory 1337 in new disk system 1304, but the old configuration information, migration worktable, and migration program are not stored, though they are in preferred embodiment 1.

FIG. 14 is an example configuration of port configuration table 1318 that indicates the port configuration. Port configuration table 1318 includes logical port ID 1401 that indicates the virtual port ID, physical port ID 1402 that indicates the physical port ID, and status 1403 that indicates the port status.

Figure 15:
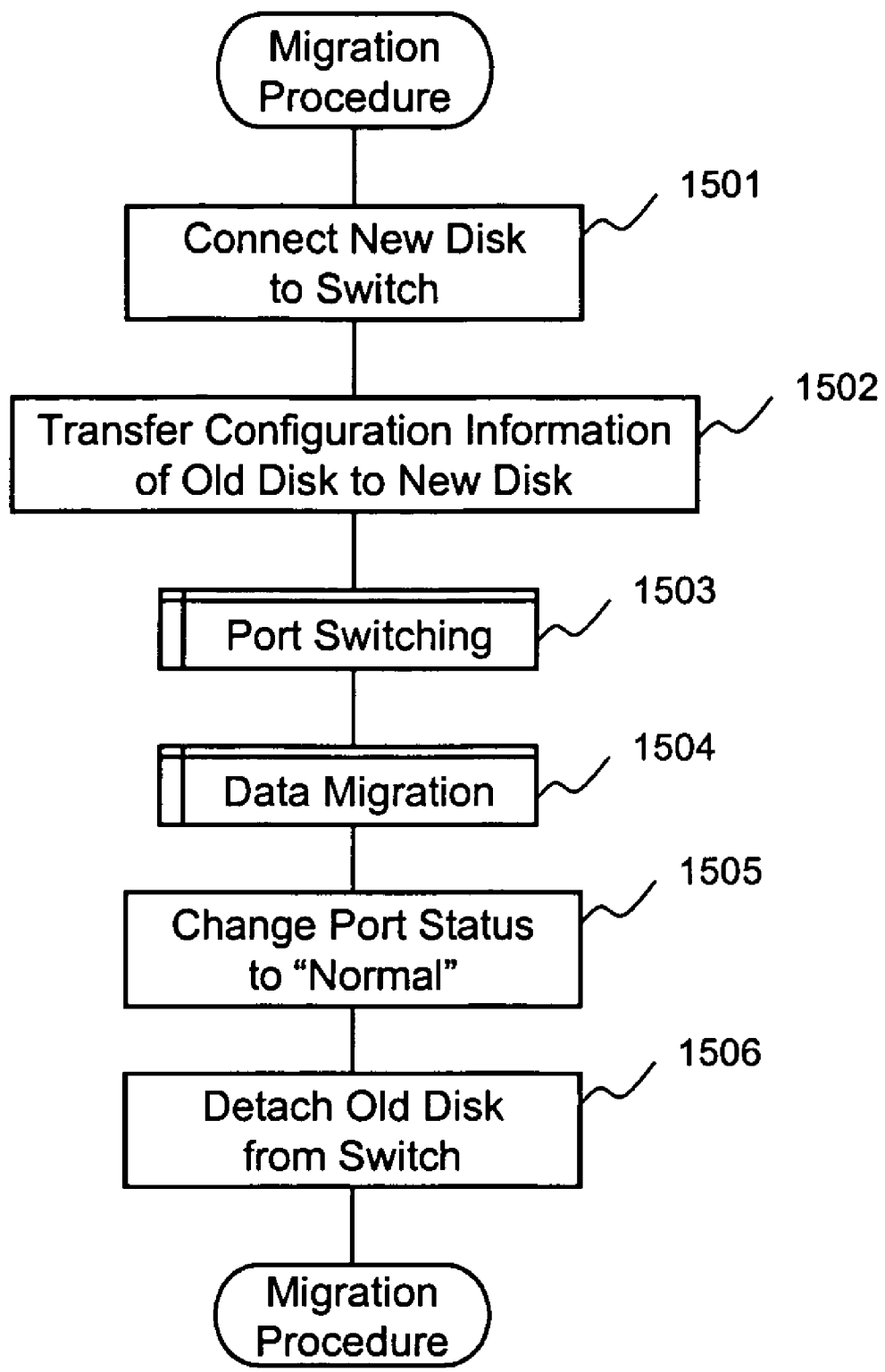
FIG. 15 indicates a flowchart of the data migration procedure of the third preferred embodiment of the present invention.

Next, using the flowchart of FIG. 15, the data migration procedure of the present preferred embodiment will be described.

An operator connects new disk system 1304 to switch 1302 (1501). This step is the same as step 901 of FIG. 9.

Next, migration program 1342 of switch 1302 reads configuration information 1327 from old disk system 1303 (1502). Configuration information 1327 is the same as that shown in FIG. 7.

After configuration information 1327 of old disk system 1303 has been transferred to switch 1302, switch control program 1319 of switch 1302 starts the port switching procedure (1503).

Also in the port switching procedure of the present preferred embodiment, similar to preferred embodiment 1, after the host I/O is stopped, the correspondence relation between logical port ID 1401 and physical port ID 1402 of old disk system 1303 and the correspondence relation between logical port ID 1401 and physical port ID 1402 of new disk system 1304 of port configuration table 1318 are changed. However, the port switching procedure of the present preferred embodiment differs from that of preferred embodiment 1 in the following point. In the present preferred embodiment, switch control program 1319 of switch 1302 sets port ID status 1403 of old disk system 1303 in port configuration table 1318 to "Migrating." The frame for the port ID with "Migrating" status 1403 in port configuration table 1318 is not sent to the corresponding port, but instead is passed to migration program 1331 of switch 1302. In other words, access to old disk system 1303 is performed by migration program 1331 of switch 1302.

In the case where the fabric is configured with a plurality of switches 1302, using the same method as preferred embodiment 1, after the host I/O is stopped, switch control program 1319 of the master switch sets port ID status 1403 of old disk system 1303 in port configuration table 1318 to "Migrating." The frame for the port ID with "Migrating" status 1403 in port configuration table 1318 is not sent to the corresponding port, but instead is passed to migration program 1331 of switch 1302. In the case where the fabric is configured with a plurality of switches 1302, it is sufficient if at least old configuration information 1327, migration worktable 1343, and migration program 1342 are provided in switch 1302, the master switch.

After the port switching procedure is completed, the data migration procedure is performed. First, migration program 1342 of switch 1302 constructs a volume according to the logical volume number and size of said volume which are configured in old disk system 1303, and then initializes variables to be used and migration worktable 1332 that is shown with FIG. 8. The procedure thereafter is the same procedure as described in preferred embodiment 1, except that it is not performed by the migration program of the new disk system, but instead by migration program 1302 of switch 1302.

After the data migration procedure is completed, switch control program 1319 of switch 1302 changes the status of new disk system 1304 in port configuration table 1318 to "Normal" (1505). The operator detaches old disk system 1303 from switch 1302 and terminates the migration procedure (1506).

Preferred Embodiment 4

The characteristic of the present preferred embodiment is that a migration program is executed on a migrator configured with a personal computer, workstation, etc. which are connected to a switch. By means of the present preferred embodiment, similar to preferred embodiment 3, since it is unnecessary for a new disk system to have a migration program, data migration from an old disk system is possible even with a disk unit that does not have this type of program. Further, in the present preferred embodiment, as in preferred embodiment 3, since the migration program is not executed on a switch, a load of the switch can be reduced.

Figure 16:
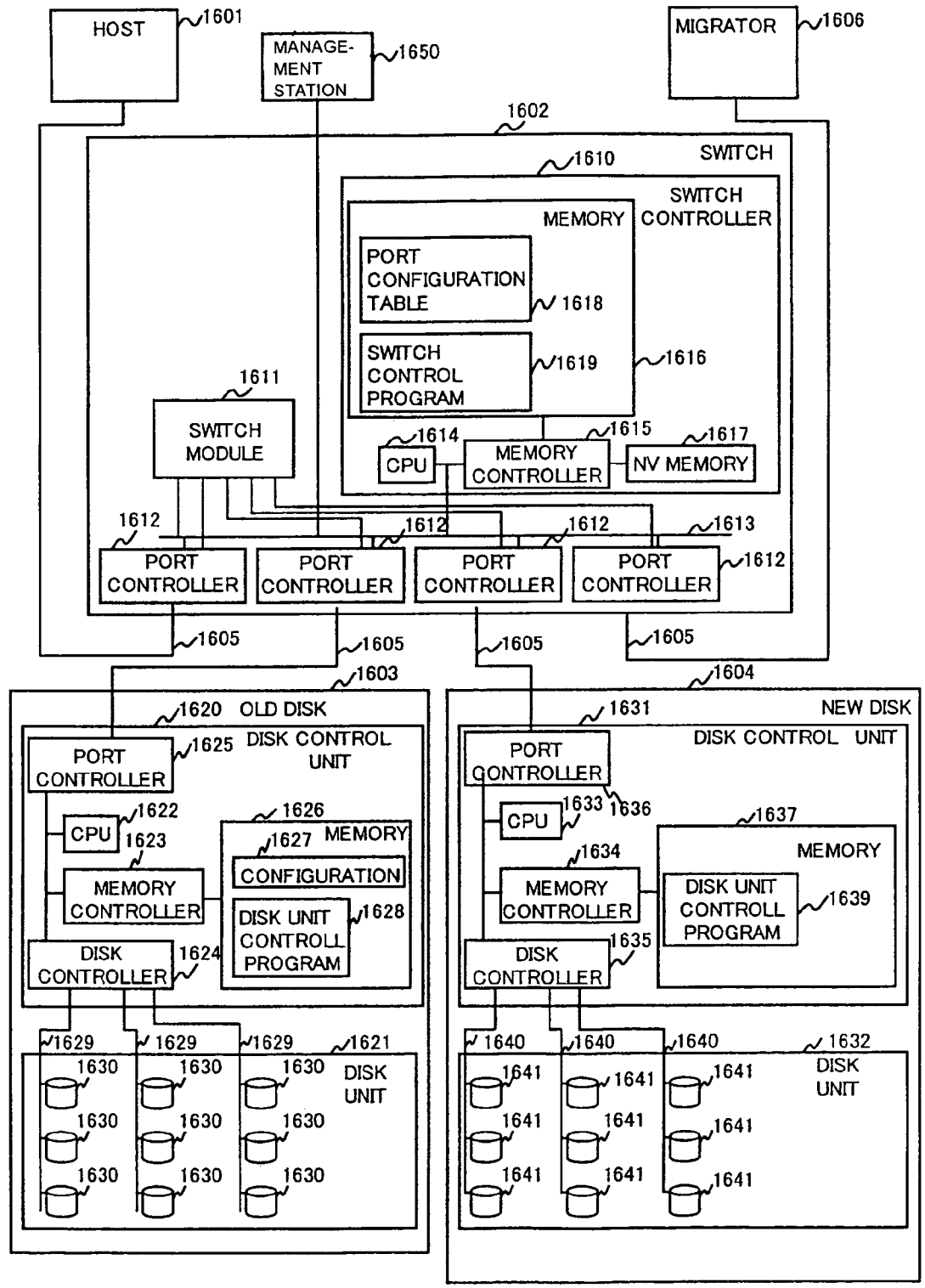
FIG. 16 is a diagram that describes the configuration of the computer system in the fourth preferred embodiment of the present invention.

Using FIG. 16, the configuration of the computer system of the present preferred embodiment will be described. However, a description of those configuration elements that are the same as configuration elements of FIG. 1 will be omitted.

A characteristic of the present preferred embodiment, as will be described later, is that migrator 1606 internally stores the migration program that performs the migration procedure, old configuration information and migration worktable. Memory 1637 in new disk system 1604 stores disk unit control program 1639, but does not store the old configuration information, migration worktable and migration program, though in preferred embodiment 1. Further, different from preferred embodiment 3, in the present preferred embodiment, the migration program, old configuration information and migration worktable are not stored in switch 1602.

Figure 17:
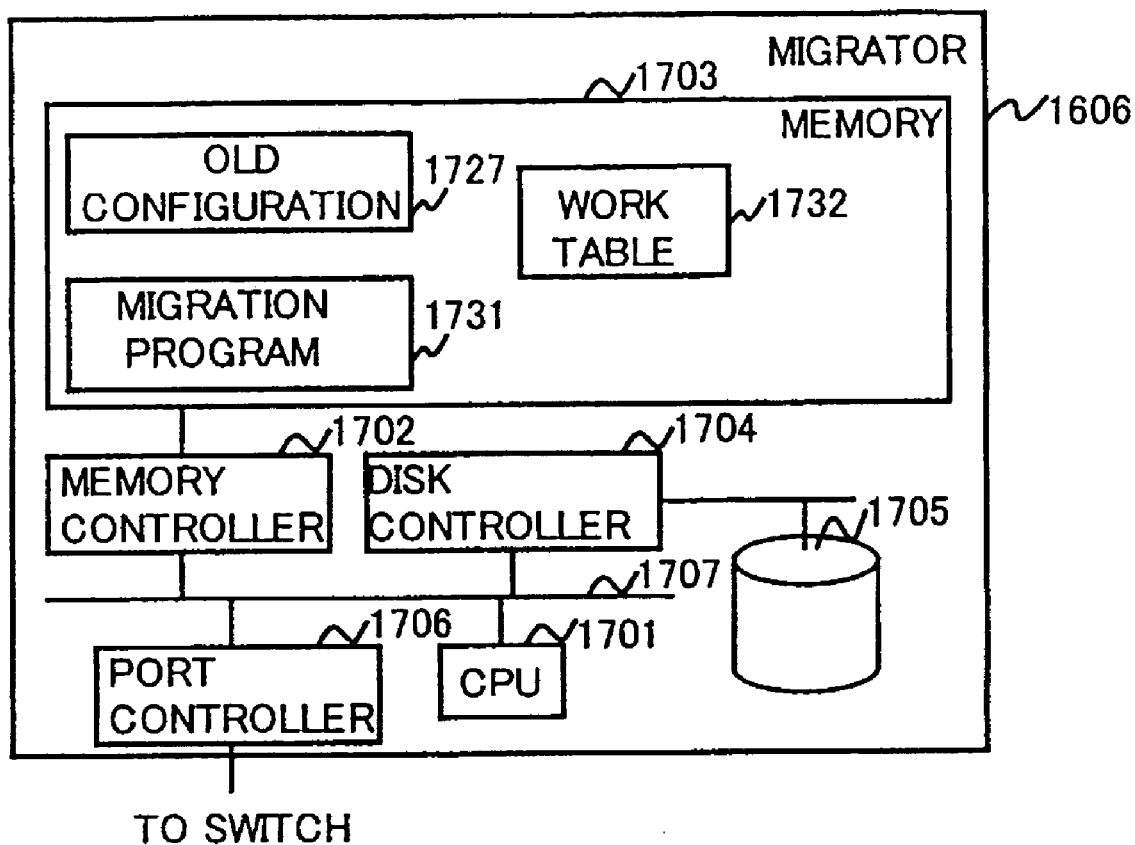
FIG. 17 indicates an example configuration of the migrator of the present invention.

FIG. 17 indicates an example configuration of migrator 1606. Migrator 1606 includes CPU 1701, memory controller 1702, port controller 1706, disk controller 1704, disk drive 1705 and memory 1703. CPU 1701 is connected to memory controller 1702, port controller 1706 and disk controller 1704 with internal bus 1701. CPU 1701 performs the exchange of control information and data with each controller. Port controller 1706 is connected to port controller 1612 of switch 1602 with fiber channel 1605 and performs the exchange of commands and data with switch 1602. The port of migrator 1606 is called the N port. The port on the switch 1602 side is called the F port. Disk drive 1705 is connected to disk controller 1704 and receives read and write requests from CPU 1701. Disk drive 1705 stores programs necessary for migrator 1606, and stores migrator program 1731 and migrator worktable 1732 that is necessary during execution of said program. Memory 1703 is connected to memory controller 1702. During execution of migration program 1731, this program is read from drive 1705 into memory 1703.

Next, the flow of the data migration procedure of the present preferred embodiment will be described. An operator connects new disk system 1604 to switch 1602 for data migration. At this time, the port ID of new disk system 1604 takes the same value as the port ID assigned to the F_Port of switch 1602, and new disk system 1604 is not recognized from host 1601. This step is the same as step 901 described in FIG. 9.

Next, migration program 1631 of migrator 1606 reads configuration information 1727 from old disk system 1603. Configuration information 1727 is the same as that indicated in FIG. 7.

After configuration information 1727 of old disk system 1603 is transferred to the migrator, the port switching procedure is performed. This procedure, similar to that described with preferred embodiment 1, suspends I/O from the host, and exchanges physical port ID 1604 of old disk system 1603 and physical port ID 1402 of new disk system 1604 in port configuration table 1618. The control program of switch 1602 sets the port ID status of old disk system 1603 in port configuration table 1618 to "Migrating." If the status in the port configuration table is "Migrating", the frame is not sent to a port, but instead is passed to migration program 1731 of migrator 1606. Access to old disk system 1603 is performed by migration program 1731 of migrator 1606. After these procedures, the I/O of host 1601 is restarted and migration program 1731 of migrator 1606 starts the migration procedure.

After the port switching procedure is completed, the data migration procedure is performed. First, migration program 1731 of migrator 1606 constructs a volume according to the logical volume number and size of said volume which are configured in old disk system 1603, and then initializes variables to be used and migration worktable 1732. The procedure thereafter is the same procedure as described in preferred embodiment 1, except that it is not performed by the migration program of the new disk system, but instead by migration program 1731 of migrator 1606.

After the data migration procedure is completed, switch control program 1619 of switch 1602 changes the status of new disk system 1604 in port configuration table 1618 to "Normal," as in preferred embodiment 3. The operator detaches old disk system 1603 from switch 1602 and terminates the migration procedure.

In addition, in the present preferred embodiment, a fiber channel connects the migrator and switch. However, it can be easily understood by those skilled in the art of the present invention that the effect of the present preferred embodiment can be obtained with connection by such means as a vendor-unique bus.

Preferred Embodiment 5

The characteristic of the present preferred embodiment is that the host implements the port switching of the switch. By means of the present preferred embodiment, there is no need to provide a port configuration table in the switch, though in preferred embodiment 1 through preferred embodiment 4. Therefore, it is possible to perform data migration even in cases where a SAN is configured using a switch that does not have this function.

Figure 18:
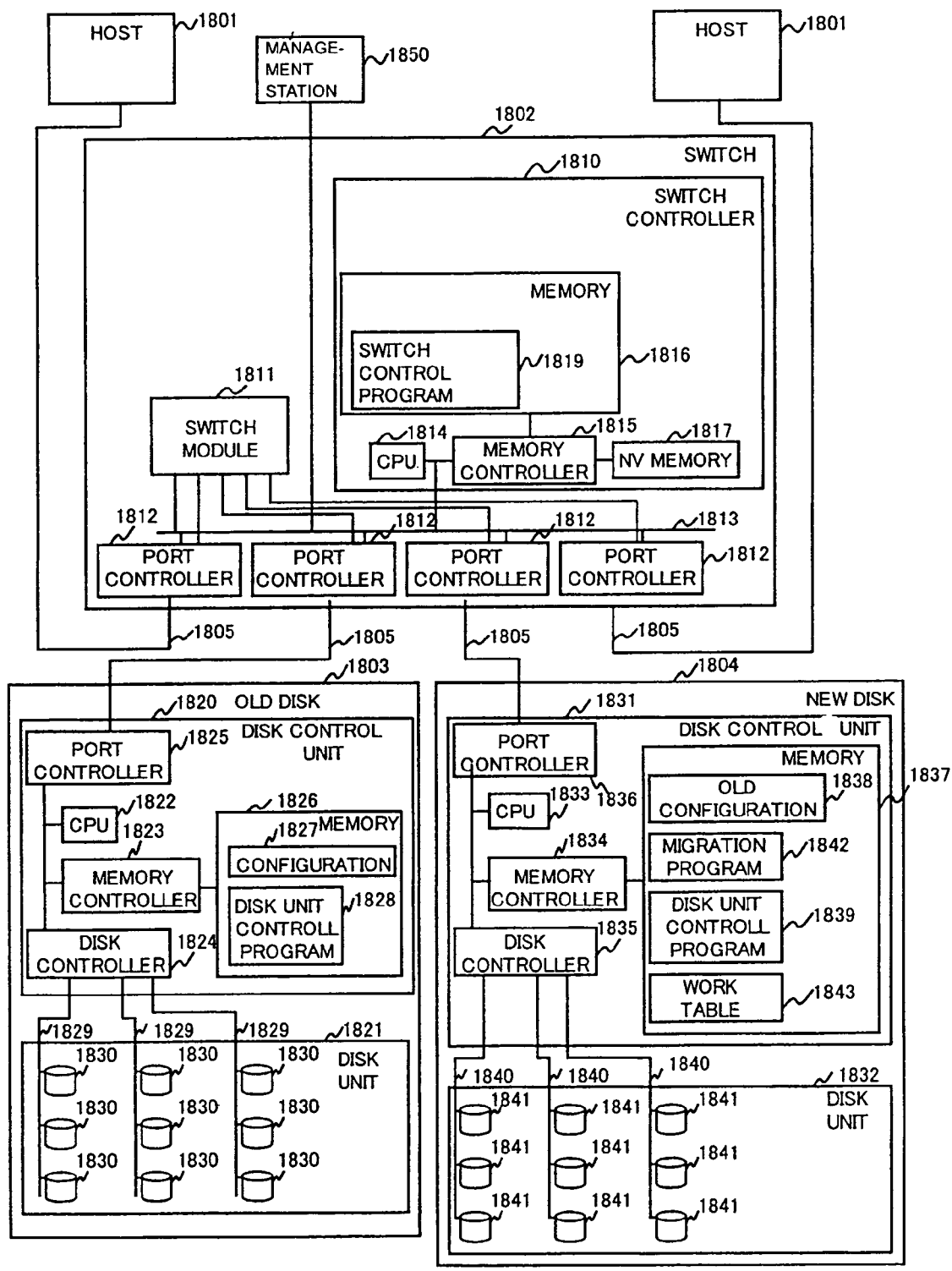
FIG. 18 is a diagram that describes the configuration of the computer system in the fifth preferred embodiment of the present invention.

Using FIG. 18, an example configuration of the computer system of the present preferred embodiment will be described. However, a description of those configuration elements that are the same as configuration elements of FIG. 1 will be omitted. As will be described later, in the present preferred embodiment, differing from preferred embodiment 1, a port configuration table is provided in host 1801 and a port configuration table is not provided in switch 1802.

Figure 19:
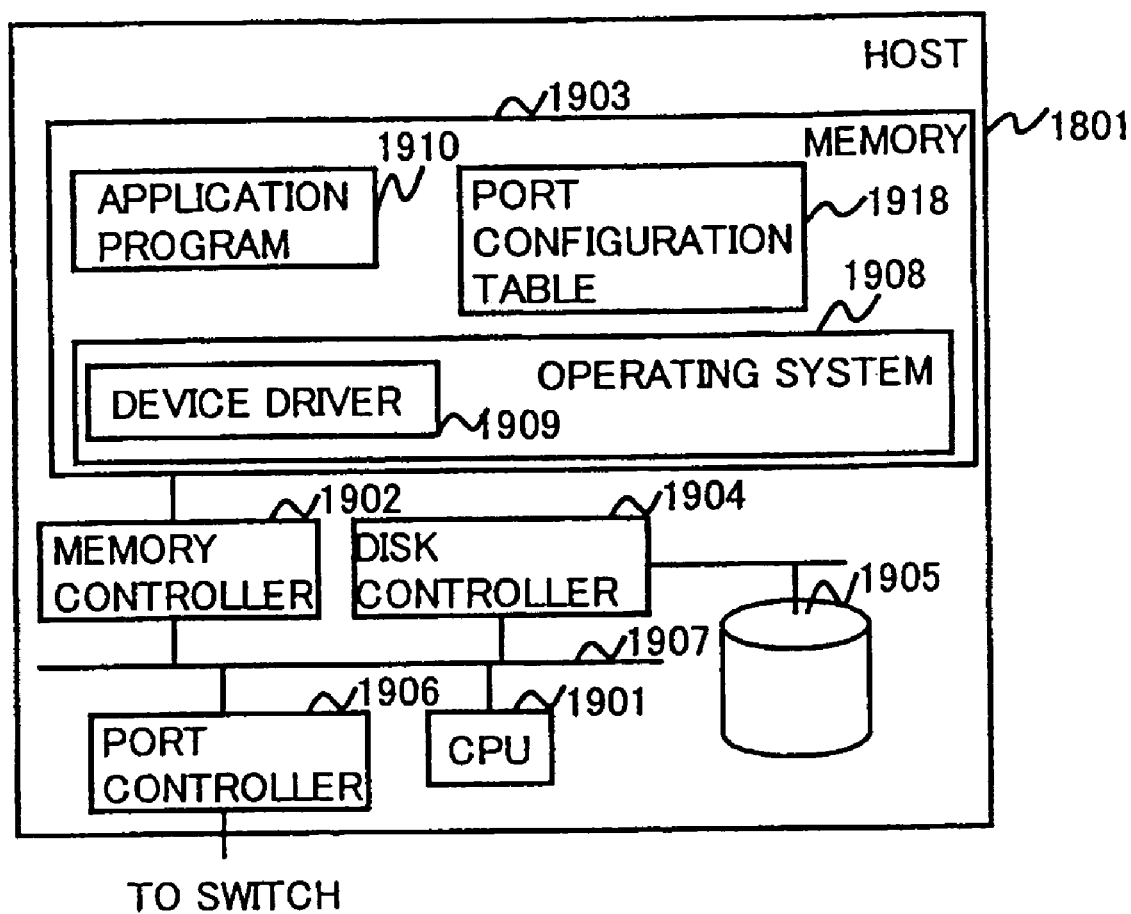
FIG. 19 is a diagram that describes the configuration of the host in the fifth preferred embodiment of the present invention.

FIG. 19 indicates an example configuration of host 1801. Host 1801 comprises CPU 1901, memory controller 1902, port controller 1906, disk controller 1904, drive 1905 and memory 1903. CPU 1901 is connected to memory controller 1902, port controller 1906 and disk controller 1904 with internal bus 1907. CPU 1901 performs the exchange of control information and data with each controller. Port controller 1906 is connected to port controller 1812 of switch 1802 with fiber channel 1805, and performs the exchange of commands and data with switch 1802. The port of host 1801 is called the N port, and the port on the switch 1802 side is called the F port. Drive 1905 is connected to disk controller 1904 and receives read and write commands from CPU 1901. Drive 1905 stores programs necessary for host 1801, and stores operating system 1908, device driver 1909, application program 1910 and port configuration table 1918. Memory 1903 is connected to memory controller 1902 and receives read and write requests from CPU 1901. Programs such as operating system 1908, disk controller 1904, device driver 1909 that controls the hardware, and application 1910 are read from disk drive 1905 into memory 1903 at the time of each program execution.

Next, the flow of the data migration procedure of the present preferred embodiment will be described. This flow is the same as the flow of the data migration procedure of preferred embodiment 1, which is shown in FIG. 9. However, in the present preferred embodiment, the port switching procedure is different from that of preferred embodiment 1. Here, only the port switching procedure will be described.

The port switching procedure of the present preferred embodiment performs the same operation both in the case where fabric 301 is configured with a single switch, and in the case where it is configured with a plurality of switches. At first, by operator command, device driver 1909 of the host notifies all hosts 1801 using old disk system 1803 of the start of port switching. Device driver 1909 of host 1801 that has received this notification temporarily stores I/O for old disk system 1803 and then queues it in memory 203 of host 1801. On the other hand, an I/O process being executed for old disk system 1803 is executed until completed. When an I/O process for old disk system 1803 is suspended, device driver 1909 notifies switch 1802 of I/O suspension completion. After receiving I/O suspension completion notification from all hosts 1801, device driver 1909 of the host that issued the notification of port switching requests all the hosts to exchange physical port ID 602 of old disk system 1803 and physical port ID 602 of new disk system 1804 in port configuration table 1918. Thereafter, the device driver of the host references port configuration table 1918 at each frame transmission or reception and performs the port switching procedure by manipulating S_ID 508 and D_ID 507. This procedure is the same as the procedure described with preferred embodiment 1.

Above, preferred embodiment 1 through preferred embodiment 5 of the present invention have been described.

Appropriate combined embodiments of these preferred embodiments are possible. For preferred embodiments 3 through 5, an example would be to connect old disk system 1303 and new disk system 1304 with a disk interface for migration, similar to preferred embodiment 2, and perform data migration via this interface.

As described above, data migration methods and devices well suited to a SAN environment can be provided by means of this invention.

Although the present invention has been described in connection with the preferred embodiments thereof, many other variations and modification will become apparent to those skilled in the art.

What is claimed is:

1. A method of migrating data from a first storage system, which is connected to a switch by a first communication channel and receives read/write requests from a host computer connected to the switch by a second communication channel, to a second storage system, said method comprising the steps of:
   connecting the second storage system to the switch by a third communication channel;
   assigning a logical identifier to the third communication channel connected to the second storage system;
   changing the logical identifier assigned to the third communication channel connected to the second storage system into another logical identifier previously assigned to the first communication channel connected to the first storage system; and
   writing, via the switch, data stored in the first storage system to the second storage system using said another logical identifier,
   wherein the logical identifier is a renumbered identifier of a physical identifier of the third communication channel and the another logical identifier is a renumbered identifier of a physical identifier of the first communication channel.

2. A data migration method according to claim 1, wherein the first communication channel connecting between the switch and the first storage system, the third communication channel connecting between the switch and the second storage system, and the second communication channel connecting between the switch and the host computer are fiber channels.

3. A method of migrating data from a first storage system, which is connected to a switch by a first communication channel and receives read/write requests from a host computer connected to the switch by a second communication channel, to a second storage system, said method comprising the steps of:
   connecting the second storage system to the switch by a third communication channel;
   assigning a logical identifier to the third communication channel connected to the second storage system;
   reading the number of logical volumes constructed in the first storage system and their sizes;
   constructing the same number and sizes of logical volumes in the second storage system as have been constructed in the first storage system;
   changing the logical identifier assigned to the third communication channel connected to the second storage system into another logical identifier previously assigned to the first communication channel connected to the first storage system; and
   writing, via the switch, data stored in the first storage system to the second storage system in volume units using said another logical identifier,
   wherein the logical identifier is a renumbered identifier of a physical identifier of the third communication channel and the another logical identifier is a renumbered identifier of a physical identifier of the first communication channel.

4. A method of migrating data from a first storage system, which is connected to one port of a switch provided with a plurality of ports each assigned its own physical port identifier by a first communication channel and receives, via the switch, read/write requests from a host computer connected to another port of said switch by a second communication channel, to a second storage, the method comprising the steps of:
   connecting the second storage system, by a third communication channel, to a port of said switch other than the ports connected to the first storage system and the host computer;
   assigning a logical port identifier to the port connected to the second storage system;
   changing the logical port identifier assigned to the port connected to the second storage system into another logical port identifier previously assigned to the port connected to the first storage system;
   writing the data in the first storage system to the second storage system via the switch;
   if, from said host computer, there is a read or write request including said another logical port identifier assigned to the port connected to the first storage system for the first storage system, then sending the request to the second storage system; and,
   if the data for the read or write request has been written already to the second storage system, then performing read or write processing of the already written data by the second storage system, and if the data for the read or write request has not yet been written to the second storage system, then writing the data for the read or write request to the second storage system, and performing read or write processing of the written data by the second storage system using said another identifier,
   wherein the logical port identifier is a renumbered identifier of a physical port identifier of the port connected to the second storage system and the another logical port identifier is a renumbered identifier of a physical port identifier of the port connected to the first storage system.

5. A data migration method according to claim 4, further comprising the steps of:
   directly connecting the first storage system and the second storage system by a fourth communication channel; and,
   without passing through the switch, writing data in the first storage system to the second storage system via the fourth communication channel that directly connects the first storage system and the second storage system.

6. A data migration method of migrating data from a first storage system, which is connected to one port of a switch provided with a plurality of ports each assigned its own physical port identifier by a first communication channel and receives, via the switch, read/write requests from a host computer connected to another port of said switch by a second communication channel, to a second storage system, the method comprising the steps of:
   connecting the second storage system to a port of the switch other than the ports connected to the first storage system and to the host computer by a third communication channel;

assigning a logical port identifier to the port connected to the second storage system;

exchanging the logical port identifier assigned to the port connected to the second storage system into another logical port identifier previously assigned to the port connected to the first storage system;

reading information on logical volumes constructed in the first storage system;

constructing the same number and same sizes of logical volumes in the second storage system as have been constructed in the first storage system;

writing data stored in the first storage system to the second storage system via the switch;

managing completion of said writing from the first storage system to the second storage system in volume units;

if, from said host computer, there is a read or write request including said another logical port identifier assigned to the port connected to the first storage system for the first storage system, then sending the request to the second storage system; and if the data for the read or write request has been written already to the second storage system, then performing read or write processing of the already written data by the second storage system, and if the data for the read or write request has not yet been written to the second storage system, then writing the data for the read or write request to the second storage system, and performing read or write processing of the written data by the second storage system using said another identifier, wherein the logical port identifier is a renumbered identifier of a physical port identifier of the port connected to the second storage system and the another logical port identifier is a renumbered identifier of a physical port identifier of the port connected to the first storage system.

7. A data migration method according to claim 6, wherein the second storage system reads, via the switch, the logical volume information from the first storage system, and manages the completion of said writing to the second storage system in volume units.

8. A data migration method according to claim 6, wherein the switch reads the logical volume information from the first storage system, constructs the same number and sizes of logical volumes in the second storage system as have been constructed in the first storage system, and manages the completion of said writing to the second storage system in volume units.

9. A data migration method according to claim 6, wherein an information processing unit connected to the switch reads the logical volume information from the first storage system, constructs the same number and sizes of logical volumes in the second storage system as have been constructed in the first storage system, and manages the completion of said writing to the second storage system in volume units.

10. A data migration method according to claim 6, wherein the second storage system reads, via the switch, the logical volume information from the first storage system, and manages the completion of said writing to the second storage system in volume units.

11. A data migration method of migrating data from a first storage system, which is connected to one port of a switch provided with a plurality of ports each assigned its own physical port identifier by a first communication channel and receives, via the switch, read/write requests from a host computer connected to another port of said switch by a second communication channel, to a second storage system, the method comprising the steps of:

connecting the second storage system to a port of the switch other than the ports connected to the first storage system and to the host computer, by a third communication channel, wherein the port connected to the second store system being assigned a logical port identifier and a port connected to the first storage system being assigned another logical port identifier;

switching the destination of a read/write request from the host computer including information designating the first storage system as a destination from the first storage system to the second storage system by the switch by exchanging the logical port identifier assigned to the port connected to the second storage system with the another logical port identifier previously assigned to the port connected to the first storage system;

writing data in the first storage system to the second storage system via the switch; and if the data for a read or write request from the host computer has been written already to the second storage system, then performing read or write processing of the already written data by the second storage system, and if the data for the read or write request has not yet been written to the second storage system, then writing the data for the read or write request to the second storage system, and performing read or write processing of the written data by said second storage system, wherein the logical port identifier is a renumbered identifier of a physical port identifier of the port connected to the second storage system and the another logical port identifier is a renumbered identifier of a physical port identifier of the port connected to the first storage system.

12. A data migration method according to claim 11, further comprising the steps of:

reading the number of logical volumes constructed in the first storage system and their sizes;

constructing the same number and sizes of logical volumes in the second storage system as have been constructed in the first storage system; and, writing, in volume units, data stored in the first storage system to the second storage system via the switch.

13. A data migration method according to claim 12, wherein the second storage system manages completion of said writing to the second storage system in volume units.

14. A system comprising:

a switch including a plurality of ports each assigned its own physical port identifier;

a first storage system connected to a first port of the plurality of ports by a first communication channel;

a second storage system connectable to a second port of the plurality of ports by a second communication channel; and a host computer connected to a third port of the plurality of ports by a third communication channel, wherein said switch assigns a logical port identifier to the second port connected to the second storage system when the second storage system is connected to the switch, changes the logical port identifier assigned to the second port connected to the second storage system into another logical port identifier already assigned to the first port connected to the first storage system, transfers the data stored in the first storage system to the second storage system, and if, from the host computer, there is a read or write request including the another logical port identifier assigned to the first port connected to the first storage system for the first storage system, sends the request to the second storage system, wherein the second storage system performs read or write processing if the data for the read or write request has been written already to the second storage system, and wherein the switch transfers data and the second storage system performs read or write request after data transfer if the data for the read or write request has not yet been written to the second storage system, wherein the logical port identifier is a renumbered identifier of a physical port identifier of the second port connected to the second storage system and the another logical port identifier is a renumbered identifier of a physical port identifier of the first port connected to the first storage system.

15. A method of migrating data from a first storage system, which is connected to a switch by a first communication channel and receives read/write requests from a host computer connected to the switch by a second communication channel, to a second storage system, said method comprising the steps of:

connecting the second storage system to the switch by a third communication channel;

assigning an identifier to the second storage system;

reading, by the switch from the first storage system, configuration information including the number of logical volumes constructed in the first storage system and their sizes;

transferring, by the switch, said configuration information read from the first storage system to the second storage system;

constructing, by the second storage system, the same number and sizes of logical volumes in the second storage system as have been constructed in the first storage system according to said configuration information transferred from the switch;

changing the identifier assigned to the second storage system into another identifier previously assigned to the first storage system; and writing, via the switch, data stored in the first storage system to the second storage system in volume units using said another identifier.

16. A method of migrating data from a first storage system, which is connected to one port of a switch provided with a plurality of ports each assigned its own physical port identifier by a first communication channel and receives, via the switch, read/write requests from a host computer connected to another port of said switch by a second communication channel, to a second storage, the method comprising the steps of:

connecting the second storage system, by a third communication channel to a port of said switch other than the ports connected to the first storage system and the host computer;

assigning a logical port identifier to the port connected to the second storage system;

changing the logical port identifier assigned to the port connected to the second storage system into another logical port identifier previously assigned to the port connected to the first storage system;

writing the data in the first storage system to the second storage system via the switch;

if, from said host computer, there is a read or write request including said another logical port identifier assigned to the port connected to the first storage system for the first storage system, then sending the request to the second storage system; and, if the data for the read or write request has been written already to the second storage system, then performing read or write processing of the already written data by the second storage system, and if the data for the read or write request has not yet been written to the second storage system, then writing the data for the read or write request to the second storage system, and performing read or write processing of the written data by the second storage system using said another identifier, wherein said switch reads configuration information defining a configuration of the first storage system from the first storage system and transfers said configuration information read from the first storage system to the second storage system, and wherein the second storage system sets a configuration thereof based at least in part on said configuration information transferred from the switch.

17. A data migration method according to claim 16, further comprising the steps of:

directly connecting the first storage system and the second storage system by a fourth communication channel; and, without passing through the switch, writing data in the first storage system to the second storage system via the fourth communication channel that directly connects the first storage system and the second storage system.

18. A data migration method of migrating data from a first storage system, which is connected to one port of a switch provided with a plurality of ports each assigned its own physical port identifier by a first communication channel and receives, via the switch, read/write requests from a host computer connected to another port of said switch by a second communication channel, to a second storage system, the method comprising the steps of:

connecting 'the second storage system to a port of the switch other than the ports connected to the first storage system and to the host computer by a third communication channel;

assigning a logical port identifier to the port connected to the second storage system;

exchanging the logical port identifier assigned to the port connected to the second storage system into another logical port identifier previously assigned to the port connected to the first storage system;

reading, by the switch from the first storage system, configuration information including information on logical volumes constructed in the first storage system;

transferring, by the switch, said configuration information read from the first storage system to the second storage system;

constructing, by the second storage system, the same number and same sizes of logical volumes in the second storage system as have been constructed in the first storage system according to said configuration information transferred from the switch;

writing data stored in the first storage system to the second storage system via the switch;

managing completion of said writing from the first storage system to the second storage system in volume units;

if, from said host computer, there is a read or write request including said another logical port identifier assigned to the port connected to the first storage system for the first storage system, then sending the request to the second storage system; and if the data for the read or write request has been written already to the second storage system, then performing read or write processing of the already written data by the second storage system, and if the data for the read or write request has not yet been written to the second storage system, then writing the data for the read or write request to the second storage system, and performing read or write processing of the written data by the second storage system using said another identifier.

19. A data migration method according to claim 18, wherein the switch reads the logical volume information from the first storage system, constructs the same number and sizes of logical volumes in the second storage system as have been constructed in the first storage system, and manages the completion of said writing to the second storage system in volume units.

20. A data migration method according to claim 18, wherein an information processing unit connected to the switch reads the logical volume information from the first storage system, constructs the same number and sizes of logical volumes in the second storage system as have been constructed in the first storage system, and manages the completion of said writing to the second storage system in volume units.

21. A data migration method of migrating data from a first storage system, which is connected to one port of a switch provided with a plurality of ports each assigned its own physical port identifier by a first communication channel and receives, via the switch, read/write requests from a host computer connected to another port of said switch by a second communication channel, to a second storage system, the method comprising the steps of:

connecting the second storage system to a port of the switch other than the ports connected to the first storage system and to the host computer, by a third communication channel;

switching the destination of a read/write request from the host computer including information designating the first storage system as a destination from the first storage system to the second storage system by the switch;

writing data in the first storage system to the second storage system via the switch; and if the data for a read or write request from the host computer has been written already to the second storage system, then performing read or write processing of the already written data by the second storage system, and if the data for the read or write request has not yet been written to the second storage system, then writing the data for the read or write request to the second storage system, and performing read or write processing of the written data by said second storage system, wherein said switch reads configuration information defining a configuration of the first storage system from the first storage system and transfers said configuration information read from the first storage system to the second storage system, and wherein the second storage system sets a configuration thereof based at least in part on said configuration information transferred from the switch.

22. A data migration method according to claim 21, further comprising the steps of:

reading the number of logical volumes constructed in the first storage system and their sizes;

constructing the same number and sizes of logical volumes in the second storage system as have been constructed in the first storage system; and, writing, in volume units, data stored in the first storage system to the second storage system via the switch.

23. A data migration method according to claim 22, wherein the second storage system manages completion of said writing to the second storage system in volume units.

24. A system comprising:

a switch including a plurality of ports each assigned its own physical port identifier;

a first storage system connected to a first port of the plurality of ports by a first communication channel;

a second storage system connectable to a second port of the plurality of ports by a second communication channel; and a host computer connected to a third port of the plurality of ports by a third communication channel, wherein said switch assigns a logical port identifier to the second port connected to the second storage system when the second storage system is connected to the switch, changes the logical port identifier assigned to the second port connected to the second storage system into another logical port identifier already assigned to the first port connected to the first storage system, transfers the data stored in the first storage system to the second storage system, and if, from the host computer, there is a read or write request including the another logical port identifier assigned to the first port connected to the first storage system for the first storage system, sends the request to the second storage system, wherein the second storage system performs read or write processing if the data for the read or write request has been written already to the second storage system, and wherein the switch transfers data and the second storage system performs read or write request after data transfer if the data for the read or write request has not yet been written to the second storage system, wherein said switch reads configuration information defining a configuration of the first storage system from the first storage system and transfers said configuration information read from the first storage system to the second storage system, and wherein the second storage system sets a configuration thereof based at least in part on said configuration information transferred from the switch.

* * * * *